United States Patent
Oh et al.

(10) Patent No.: US 10,753,906 B2
(45) Date of Patent: Aug. 25, 2020

(54) SYSTEM AND METHOD USING SOUND SIGNAL FOR MATERIAL AND TEXTURE IDENTIFICATION FOR AUGMENTED REALITY

(71) Applicant: PCMS Holdings, Inc., Wilmington, DE (US)

(72) Inventors: Hyun Oh Oh, Seoul (KR); Jin Sam Kwak, Uiwang-si (KR); JuHyung Son, Uiwang-si (KR)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/317,777

(22) PCT Filed: Aug. 8, 2017

(86) PCT No.: PCT/US2017/045933
§ 371 (c)(1),
(2) Date: Jan. 14, 2019

(87) PCT Pub. No.: WO2018/034894
PCT Pub. Date: Feb. 22, 2018

(65) Prior Publication Data
US 2019/0293609 A1    Sep. 26, 2019

Related U.S. Application Data

(60) Provisional application No. 62/375,216, filed on Aug. 15, 2016.

(51) Int. Cl.
*G01N 29/11*    (2006.01)
*G01N 29/44*    (2006.01)
(Continued)

(52) U.S. Cl.
CPC .......... *G01N 29/11* (2013.01); *G01N 29/348* (2013.01); *G01N 29/38* (2013.01);
(Continued)

(58) Field of Classification Search
None
See application file for complete search history.

(56) References Cited

U.S. PATENT DOCUMENTS 5,361,767 A    11/1994 Yukov
2004/0150296 A1    8/2004 Park
(Continued)

OTHER PUBLICATIONS

Wikipedia, "Google Glass". Wikipedia web article modified on Aug. 7, 2016, available at: https://en.wikipedia.org/w/index.php?title=Google_Glass&oldid=733391198, 14 pages.
(Continued)

*Primary Examiner* — Michelle Chin
(74) *Attorney, Agent, or Firm* — Invention Mine LLC

(57) ABSTRACT

Systems and methods are described for determining a material of an object using sound. Exemplary methods employ a head-mounted display (HMD). In an embodiment, the method includes determining, using a depth camera function of the HMD, a distance to an object; emitting, using a speaker of the AR HMD, a generated sound signal; and responsive to emitting the sound signal, detecting a reflected sound signal. Relative to the emitted sound signal, the HMD determines attenuation levels for a temporal portion of the reflected sound signal for at least two frequency ranges of the reflected sound signal, the temporal portion of the reflected sound signal corresponding to a computed round-trip travel time of the sound signal traveling the determined distance to and from the object. Based upon the determined attenuation levels, the determines a material corresponding to the attenuation levels.

20 Claims, 16 Drawing Sheets

(51) Int. Cl.
| | |
|---|---|
| *G06F 3/14* | (2006.01) |
| *G01N 29/34* | (2006.01) |
| *G01N 29/38* | (2006.01) |
| *G01S 7/539* | (2006.01) |
| *G06F 3/01* | (2006.01) |
| *G01S 15/89* | (2006.01) |
| *G06K 9/40* | (2006.01) |
| *G01S 15/86* | (2020.01) |
| *G01S 17/04* | (2020.01) |
| *G06K 9/00* | (2006.01) |

(52) U.S. Cl.
CPC .......... *G01N 29/4463* (2013.01); *G01S 7/539* (2013.01); *G01S 15/86* (2020.01); *G01S 15/89* (2013.01); *G01S 17/04* (2020.01); *G06F 3/011* (2013.01); *G06F 3/14* (2013.01); *G06K 9/40* (2013.01); *G01N 2291/028* (2013.01); *G01N 2291/0289* (2013.01); *G01N 2291/045* (2013.01); *G06K 9/00671* (2013.01)

(56) References Cited

U.S. PATENT DOCUMENTS

| | | | |
|---|---|---|---|
| 2007/0277611 | A1 | 12/2007 | Portzgen |
| 2010/0278008 | A1 | 11/2010 | Ammar |
| 2013/0182858 | A1 | 7/2013 | You |
| 2013/0321620 | A1 | 12/2013 | Kim |
| 2014/0362253 | A1* | 12/2014 | Kim ....................... H04N 5/262 348/231.4 |
| 2015/0042789 | A1 | 2/2015 | Inwood |
| 2016/0217590 | A1 | 7/2016 | Mullins |

OTHER PUBLICATIONS

DHL, "Vision Picking at DHL—Augmented Reality in Logistics". YouTube link, Web archive dated Mar. 24, 2017, from, https://web.archive.org/web/20170324111330/https://www.youtube.com/watch?v=I8vYrAUb0BQ, 43 pages.
Wikipedia, "Microsoft HoloLens". Wikipedia web article modified on Jul. 22, 2016, available at: https://en.wikipedia.org/w/index.php?title=Microsoft_HoloLens&oldid=731004311, 10 pages.
Hasegawa Tatsuhito et al: "Determining Smartphone's Placement Through Material Detection, Using Multiple Features Produced in Sound Echoes" IEEE Access, vol. 5, Mar. 24, 2017 (Mar. 24, 2017), pp. 5331-5339, XP011649260, DOI: 10.1109/ACCESS.2017.2687467, [retrieved on May 12, 2017].
International Search Report and Written Opinion of the International Searching Authority for PCT/US2017/045933 dated Nov. 20, 2017.
International Preliminary Report on Patentability for PCT/US2017/045933 dated Aug. 2, 2018.
Wikipedia, "Google Glass". Web Archive dated Jul. 29, 2017 from, https://web.archive.org/web/20170718005404/https://en.wikipedia.org/wiki/Google_Glass, 17 pages.
DHL, "Augmented Reality in Logistics". Changing the way we see logistics, a DHL perspective, (2014), available at: http://www.dhl.com/augmentedreality, 28 pages.
Microsoft, "Hololens; A new way to see your world". Web Archive dated Jul. 30, 2017, from https://web.archive.org/web/20170729143437/https://www.microsoft.com/en-us/hololens/hardware, 4 pages.
Wikipedia, "Millimeter Wave Scanner". Web Archive dated Jul. 22, 2017, from https://web.archive.org/web/20170722210252/https://en.wikipedia.org/wiki/Millimeter_wave_scanner, 7 pages.
Truesdale, A., "Absorption Coefficients". Web Archive dated Dec. 14, 2014, from https://web.archive.org/web/*/https://courses.physics.illinois.edu/phys193/Student_Reports/Fall02/Alan_Truesdale/Alan_Truesdale_Absorbtion_Coefficients.pdf, 2 pages.
Farina, A., et. al., "Measurement of The Sound Absorption Coefficient of Materials with A New Sound Intensity Technique". Web Archive dated Oct. 18, 2006, from https://web.archive.org/web/20061018214306/http://www.ramsete.com/Public/Papers/094-AES97.pdf, 18 pages.
Wikibooks, "Engineering Acoustics; Outdoor Sound Propagation". Web Archive dated Feb. 28, 2017, from https://web.archive.org/web/20170228193029/https://en.wikibooks.org/wiki/Engineering_Acoustics/Outdoor_Sound_Propagation, 14 pages.
Wikipedia, "Time-of-flight camera". Web Archive dated Jul. 11, 2017, from https://web.archive.org/web/20170711074834/https://en.wikipedia.org/wiki/Time-of-flight_camera, 11 pages.
Wikipedia, "Gray Card". Web Archive dated May 15, 2017, from https://web.archive.org/web/20170515182256/https://en.wikipedia.org/wiki/Gray_card, 2 pages.
Kong, S. Y., et. al., "Preliminary Study of Using Acoustic Signal for Material Identification in Underwater Application". In First International Conference on Artificial Intelligence, Modelling and Simulation, IEEE Computer Society, (2013), pp. 290-293.

* cited by examiner 200 235 245 255 265 275 285 295 305

SYSTEM AND METHOD USING SOUND SIGNAL FOR MATERIAL AND TEXTURE IDENTIFICATION FOR AUGMENTED REALITY

CROSS-REFERENCE TO RELATED APPLICATIONS

This present application is a national stage application under 35 U.S.C. 371 of International Application No. PCT/US2017/045933, entitled SYSTEM AND METHOD USING SOUND SIGNAL FOR MATERIAL AND TEXTURE IDENTIFICATION FOR AUGMENTED REALITY, filed on Aug. 8, 2017, which claims benefit under 35 U.S.C. 119(e) from U.S. Provisional Patent Application Ser. No. 62/375,216, entitled "System and Method Using Sound Signal for Material and Texture Identification for Augmented Reality," filed Aug. 15, 2016, the entirety of which is incorporated herein by reference.

BACKGROUND

AR (Augmented Reality) enhances an ability of human perception by delivering analyzed/organized data based on real world objects. Recently, various kinds of AR-related products and applications have been applied to industrial, commercial, medical, and scientific markets.

While Google Inc. decided to stop producing the Google Glass® smart glasses due to privacy and safety issues, there have since been many smart-glasses successors of the Google Glass®. In January 2015, DHL performed pilot tests for utilizing AR technology in logistics. In the tests, DHL implemented technology called 'vision picking' with help from Ricoh and Ubimax. The vision picking technology offers intuitive delivery instructions to warehouse workers through smart glasses.

In 2016, Microsoft launched a development edition of the HoloLens®. The Microsoft HoloLens® Development Edition contains multiple sensors including an IMU (inertial measurement unit), a depth camera, four environment understanding cameras, a photo/video camera, four microphones, and an ambient light sensor. By using such sensors, the Microsoft HoloLens® Development Edition is able to recognize environments and supports sensual and natural interface commands referred to as GGV (gaze, gesture, and voice).

SUMMARY

Systems and methods are presented for identifying a material and/or texture of an object. Exemplary systems and methods may determine a material and/or a texture of an object using sound. Exemplary systems and methods may be implemented, at least in part, in an augmented reality display device such as a head-mounted display (HMD), a smartphone, or a tablet computer.

In an exemplary embodiment, a method of determining, using an augmented reality (AR) head-mounted display (HMD), a material and/or texture of an object is presented. One such method includes determining, using a depth camera function of the HMD, a distance to an object; emitting, using a speaker of the HMD, a generated sound signal; responsive to emitting the sound signal, detecting a reflected sound signal; determining, relative to the sound signal emitted by the speaker of the HMD, attenuation levels for a temporal portion of the reflected sound signal for at least two frequency ranges of the reflected sound signal, the temporal portion of the reflected sound signal corresponding to a computed round-trip travel time of the sound signal traveling the determined distance to and from the object; and determining, based upon the determined attenuation levels for at least two frequency ranges of the temporal portion of the reflected sound signal, at least one material and/or texture corresponding to the attenuation levels.

In another exemplary embodiment, a system is presented. The system comprises a processor and a non-transitory storage medium storing instructions operative, when executed by the processor, to perform the functions of: determining, using a depth camera function of an HMD, a distance to an object; emitting, using a speaker of the HMD, a generated sound signal; detecting a reflected sound signal; determining, relative to the sound signal emitted by the speaker of the HMD, attenuation levels for a temporal portion of the reflected sound signal for at least two frequency ranges of the reflected sound signal, the temporal portion of the reflected sound signal corresponding to a computed round-trip travel time of the sound signal traveling the determined distance to and from the object; and determining, based upon the determined attenuation levels for the at least two frequency ranges of the temporal portion of the reflected sound signal, at least one material and/or texture corresponding to the attenuation levels.

In at least one embodiment, the method further comprises obtaining, at the HMD, object-selection data that is indicative of movement of a user of the HMD with respect to the object, wherein a direction with respect to the object in which the generated sound signal is emitted is based on the object-selection data.

In at least one embodiment, the method further comprises determining received signal strength data for the detected reflected sound signal, wherein determining the attenuation levels comprises adjusting the received signal strength data based on atmosphere-condition data associated with an atmosphere in which the object is located.

In at least one embodiment, determining, based upon the determined attenuation levels for the at least two frequency ranges of the temporal portion of the reflected sound signal, a material of the object comprises comparing the determined attenuation levels with respective sound absorption coefficients associated with the material.

In at least one embodiment, the attenuation levels are calibrated based on atmosphere-condition data associated with an atmosphere in which the object is located.

In at least one embodiment, the atmosphere-condition data comprises data selected from the group consisting of humidity data and temperature data.

In at least one embodiment, the atmosphere-condition data comprises respective sound absorption coefficients corresponding to the at least two frequency levels.

In at least one embodiment, the method further comprises presenting, via a display of the HMD, material information based on the determined material. For example, the HMD may display text indicating the identity of the determined material (e.g. the word "brick" or "wood"), or the HMD may display an icon representing the determined material (e.g. an icon of a brick or a board of wood). In at least one such embodiment, wherein presenting, via a display of the HMD, material information based on the determined material comprises augmenting the material information over an image including the object.

In at least one embodiment, the HMD includes a sound signal transceiver that performs the detecting of the reflected sound signal.

In at least one embodiment, the emitted sound signal is an ultrasound signal.

In at least one embodiment, the emitted sound signal comprises two or more distinct frequencies.

In at least one embodiment, the method further comprises presenting an AR character via a display of the HMD, the AR character interacting with the object based on the determined material of the object.

In at least one embodiment, the method further comprises detecting the object from a plurality of objects at least by emitting a light signal from a time-of-flight camera, in a direction of the sound signal.

DETAILED DESCRIPTION

Figure 1:
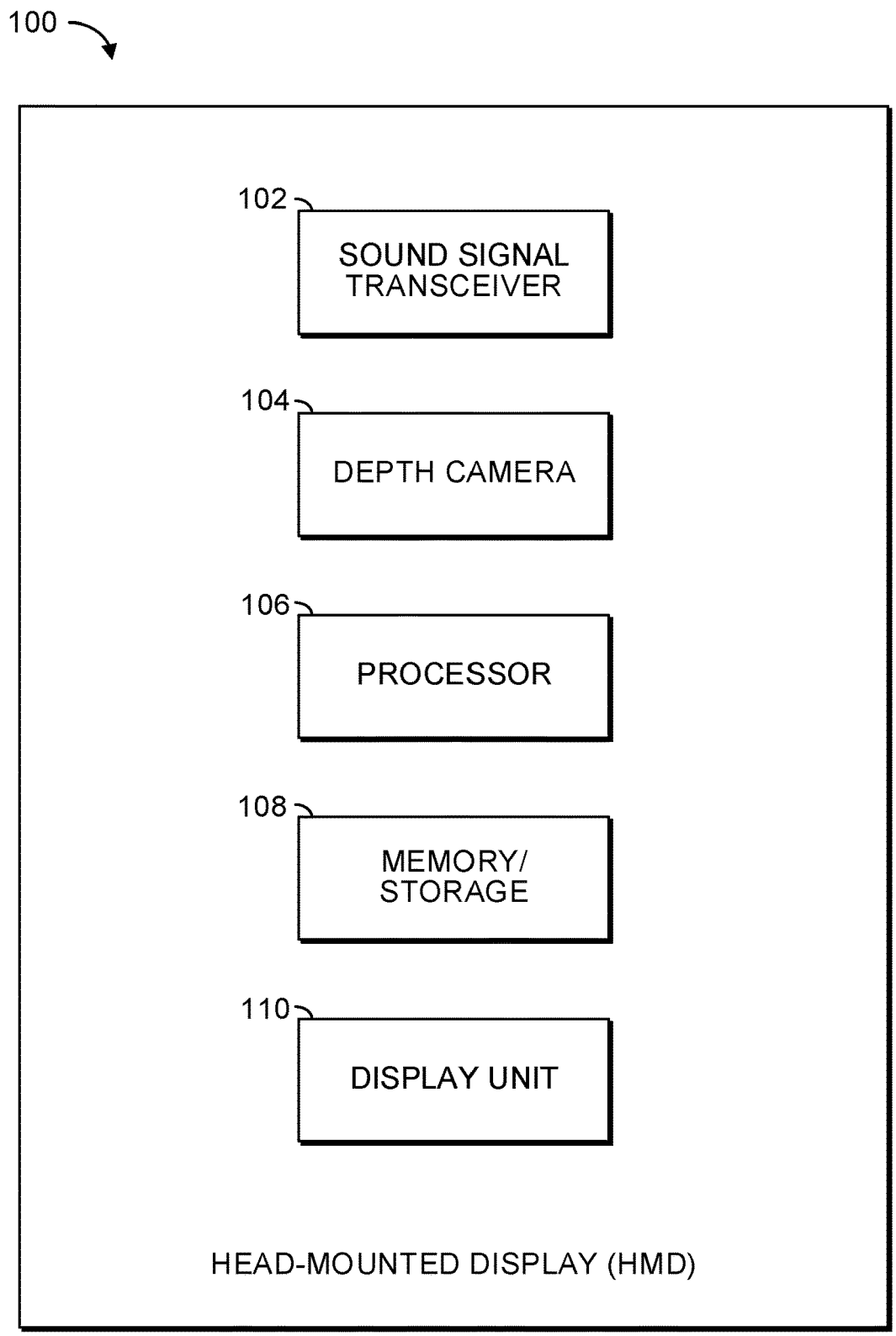
FIG. 1 is a block diagram illustrating an exemplary architecture of an exemplary augmented-reality system implemented on a head-mounted display (HMD) in accordance with some embodiments.

Augmented Reality (AR) techniques overlay images of real-world objects with virtual information. For some AR technology, understanding the phenomenon and the objects of the real world may be useful. AR applications may identify objects in the real world and/or may process overlay related computer-generated information onto the corresponding identified objects. In some AR applications described herein, objection identification includes discerning a material and/or a texture of the object. For example, the real-world objects may have materials and/or textures, such as, cloth, fur, skin, glass, paper, etc.

Recognizing a material and/or a texture of a target object may be useful to overlay augmented information on the target object realistically. For example, identifying a material and/or a texture of one or more real objects from captured video and/or images (e.g., captured by a head-mounted display (HMD)) may enable improved tracking of the one or more real objects and/or may enable more realistic/accurate overlay of augmented information on the one or more real objects. Interactions of AR objects with real-world objects may be based on material and/or texture determinations of the real-world objects. For example, if a floor/ground of a real-world environment is determined to be hardwood, an AR character may be augmented to walk or slide on the hardwood floor differently than if the floor/ground of the real-world environment is determined to be sand. As another example, if a portion of a wall of a real-world environment is determined to be glass, an AR character shining a flashlight may be augmented differently (e.g., taking into account interactions of a shining flashlight with glass) than if the portion of the wall is determined to be brick.

Discerning materials and/or textures of real-world objects from captured video and/or images, for example, using a lightweight and/or portable device such as a smartphone, may be useful to detect materials and/or textures of the objects without touching the objects by hand. For example, an object may be corrosive or dangerous to handle by hand, and identifying the material of the object using a smartphone (or HMD) without touching the object may be useful in such a scenario to avoid injury. As another example, an object may be rare or fragile, such as a rare artifact or a delicate sculpture, and determining materials and/or textures of such rare or fragile objects using a smartphone (or HMD) may be useful to avoid damaging those objects. As a further example, objects may be hard to reach, such as objects that are part of, or on, a ceiling or a roof, and determining materials and/or textures of such hard-to-reach objects using a smartphone (or HMD) may be useful. Law enforcement or custom inspection using a smartphone (or HMD) to determine materials and/or textures of objects without touching the objects may help preserve possible evidence, such as fingerprints, and/or may help to identify illegal substances.

While numerous computer vision solutions have been proposed for object recognition, some current approaches are employed in ideal laboratory conditions for object identification. A more practical AR system would be equipped to perform texture and object recognition under a wide range of lighting conditions of the real-world environment. The disclosed systems and methods may operate independently from the lighting conditions of the environment in which the disclosed systems and methods operate.

A step in an overlay process for AR may be to correctly identify the object and determine the material of the identified object so that the overlaid image matches the fine-feature characteristics of the original image. In some applications, a real-time identification of objects is preferable. However, object identification solely with visual information may be challenging in real-time, for example, in an environment with a mobile/moving AR HMD employed for object detection and/or mobile/moving to-be-identified objects.

While the application of a Millimeter wave scanner can be useful to detect objects underneath an object, these scanners (e.g., for applications in the terahertz frequency band range) may be large and/or costly, which may hinder their application to small (e.g., portable) electronic devices (e.g., HMDs such as smart glasses). Therefore, a technique for identifying a material and/or texture of an object that is less costly and/or lighter in weight may be useful for AR HMDs and/or for other wearable and/or portable AR devices.

Some sensing techniques may incorporate sound for sensing purposes. In some scenarios, employing sensing techniques that incorporate sound for sensing purposes may be more straightforward than employing other sensing techniques. Research related to sound generation and control has progressed for many years. As a result, sensing methods incorporating sound have been employed for a variety of purposes and in a variety of technologies, such as underwater sonar systems, proximity sensors for vehicles, product testing, ultrasonic sensors (e.g., for medical use), and for other purposes and in other technologies. However, research pertaining to incorporating sound sensing techniques in mobile smart devices, AR, and/or VR (virtual reality) has not progressed.

In the present disclosure, various elements of one or more of the described embodiments are referred to as "modules" that carry out (i.e., perform, execute, and the like) various functions described herein. As the term "module" is used herein, each described module includes hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module also includes instructions executable for carrying out the one or more functions described as being carried out by the particular module, where those instructions could take the form of or at least include hardware (i.e., hardwired) instructions, firmware instructions, software instructions, and/or the like, stored in any non-transitory computer readable medium deemed suitable by those of skill in the relevant art.

FIG. 1 is a block diagram of an exemplary architecture of an augmented-reality (AR) system, implemented in an HMD, for identifying a material and/or texture of an object in accordance with some embodiments. As illustrated in FIG. 1, the exemplary architecture of the exemplary AR system 100, implemented in the HMD, includes a sound signal transceiver 102, a depth camera 104, a processor 106, memory/storage 108, and a display unit 110. In some embodiments, the sound signal transceiver 102 is configured to emit and/or receive ultrasound signals. In such embodiments, one or more air-coupled ultrasonic transducers may be employed to emit and/or receive ultrasound signals. One such example air-coupled ultrasonic transducer is the SONAIR Ultrasonic Inspection System available from Sonotec Ultrasonic Solutions. In some embodiments, the example sound signal transceiver 102 of FIG. 1 includes an acoustic matching layer. Losses which may result from poor impedance matching between air (or other gas mediums) and a solid material may be reduced by including the acoustic matching layer. In one embodiment, the acoustic matching layer includes polymer (e.g., a lightweight polymer). However, it should be understood that the acoustic matching layer may include any suitable material for reducing losses that may result from an impedance mismatch of a solid and a gas. In some embodiments, the sound signal transceiver 102 is configured to emit and/or receive sound signals of various frequencies simultaneously. In some embodiments, the AR system 100 employs a plurality of sound signal transceivers, and one or more of the plurality of sound signal transceivers are tuned to a different frequency. In some embodiments, instead of an AR HMD, other types of HMDs may be employed, such as, for example, VR HMDs, mixed-reality HMDs, and the like. In some embodiments, instead of an HMD, other types of mobile display devices can be used, such as, for example, smart phones, cellular telephones, personal digital assistants (PDAs), handheld computers, pocket-sized computers, tablets, laptop computers, and the like.

An incident sound wave may be reflected and/or absorbed differently for different materials and/or for materials having different textures. Accordingly, a material may have one or more reflection/absorption characteristics for an incident wave that may be unique to that material. Sound reflection coefficients (or conversely sound absorption coefficients) have been well studied. Table 1 below depicts example sound absorption coefficients for a variety of materials for various frequencies of an incident wave. An example technique for measuring sound absorption coefficients is described in A. Farina and A. Torelli "Measurement of the Sound Absorption Coefficient of Materials with a New Sound Intensity Technique," AES Paper 4409, AES Convention 102 (March 1997), the entirety of which is incorporated herein by reference.

TABLE 1

| MATERIALS | SOUND ABSORPTION COEFFICIENTS | | | | | |
|---|---|---|---|---|---|---|
| | 125 Hz | 250 Hz | 500 Hz | 1 kHz | 2 kHz | 4 kHz |
| Brick, unglazed | .03 | .03 | .03 | .04 | .05 | .07 |
| Brick, unglazed, painted | .01 | .01 | .02 | .02 | .02 | .03 |
| Carpet, heavy, on concrete | .02 | .06 | .14 | .37 | .60 | .65 |
| Carpet, heavy, on concrete, on 40 oz. hairfelt or foam rubber | .08 | .24 | .57 | .69 | .71 | .73 |
| Carpet, heavy, on concrete, with impermeable latex backing on 40 oz. hairfelt or foam rubber | .08 | .27 | .39 | .34 | .48 | .63 |

TABLE 1-continued

| | | SOUND ABSORPTION COEFFICIENTS | | | | | |
|---|---|---|---|---|---|---|---|
| MATERIALS | | 125 Hz | 250 Hz | 500 Hz | 1 kHz | 2 kHz | 4 kHz |
| Concrete block, light, porous | | .36 | .44 | .31 | .29 | .39 | .25 |
| Concrete block, dense, painted | | .10 | .05 | .06 | .07 | .09 | .08 |
| Fabrics | Light velour, 10 oz. per sq. yd., hung straight, in contact with wall | .03 | .04 | .11 | .17 | .24 | .35 |
| | Medium velour, 14 oz. per sq. yd., draped to half area | .07 | .31 | .49 | .75 | .70 | .60 |
| | Heavy velour, 18 oz. per sq. yd., draped to half area | .14 | .35 | .55 | .72 | .70 | .65 |
| Floor | Concrete or terrazzo | .01 | .01 | .015 | .02 | .02 | .02 |
| | Linoleum, asphalt, rubber, or cork tile on concrete | .02 | .03 | .03 | .03 | .03 | .02 |
| | Wood | .15 | .11 | .10 | .07 | .06 | .07 |
| | Wood parquet | .04 | .04 | .07 | .06 | .06 | .07 |
| Glass | Large panes of heavy plate glass | .18 | .06 | .04 | .03 | .02 | .02 |
| | Ordinary window glass | .35 | .25 | .18 | .12 | .07 | .04 |
| Gypsum board, ½-in., nailed to 2 × 4's 16 in. o.c. | | .29 | .10 | .05 | .04 | .07 | .09 |
| Marble or glazed tile | | .01 | .01 | .01 | .01 | .02 | .02 |
| Plaster, gypsum or lime, smooth finish on tile or brick | | .013 | .015 | .02 | .03 | .04 | .05 |

Based on known sound absorption coefficients and/or known sound reflection coefficients, the material and/or texture of an object in the real world may be identified in real-time by emitting an incident sound signal via the HMD of the system 100 (e.g., via the sound signal transceiver 102 of the system 100) and receiving the sound signal at the HMD, the received sound signal being reflected from the object.

Figure 2:
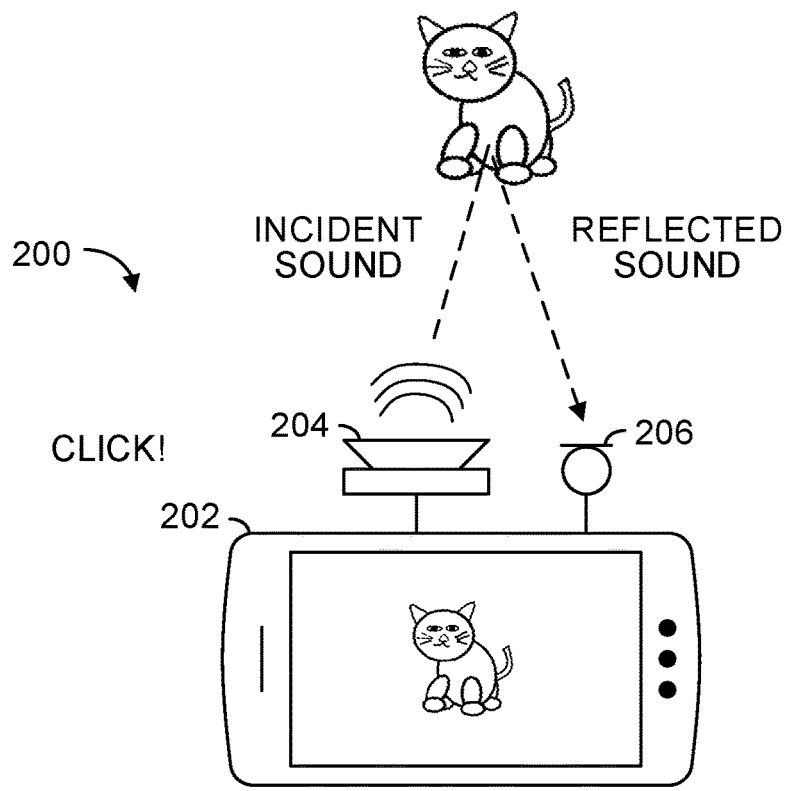
FIG. 2 illustrates an overview of an exemplary scenario employing an exemplary smartphone in accordance with some embodiments.
Figure 3:
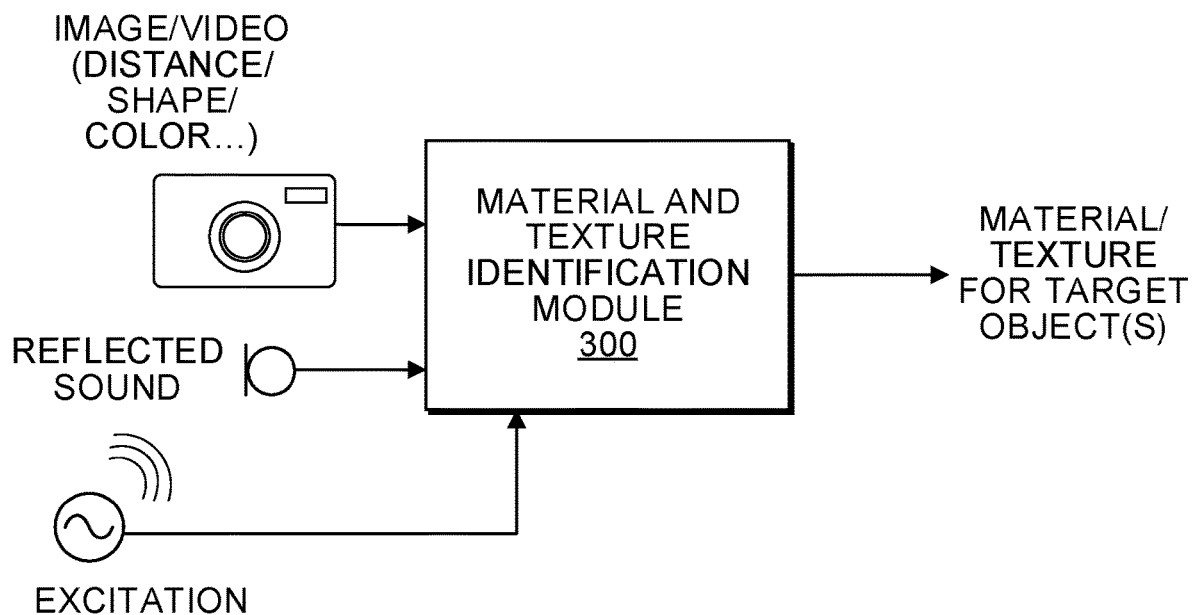
FIG. 3 is a block diagram illustrating an exemplary material and/or texture identification module in accordance with some embodiments.

FIG. 2 illustrates an exemplary scenario employing an exemplary system, implemented on a smartphone, for identifying a material and/or texture of an object in accordance with some embodiments. In this exemplary scenario, the exemplary system 200, implemented on the smartphone 202, includes a speaker and/or transducer 204 (both of which are referred to herein as a "speaker") that is embedded in (or otherwise communicatively coupled to) the exemplary smartphone 202. An electrical excitation signal is generated, for example by a signal generator of the smartphone. Responsive to the electrical excitation being generated, a sound signal may be emitted by the speaker 202. The exemplary system 200 includes a camera that captures a target object. As shown in FIG. 2, a display of the smartphone 202 displays an image of a cat doll, which is made of ceramic, that is captured by the camera. In the exemplary scenario illustrated in FIG. 2, the target object is a cat doll made of ceramic. The emitted sound signal travels over a medium (e.g., air) and then is reflected from the target object (e.g., an exterior surface of the target object). The exemplary system includes a microphone 206 that receives the reflected sound signal. The reflected sound signal received by the microphone 206 is sent to an object material/texture identification module for further processing/analysis. A block diagram of an exemplary object material/texture identification module 300 is illustrated in FIG. 3. The object material/texture identification module 300 may conduct a multi-modal analysis (e.g., based on sound data, image data, and/or other data) to identify the material and/or texture of the target object. The object material/texture identification module 300 may output an indication of the determined material/texture.

Figure 4:
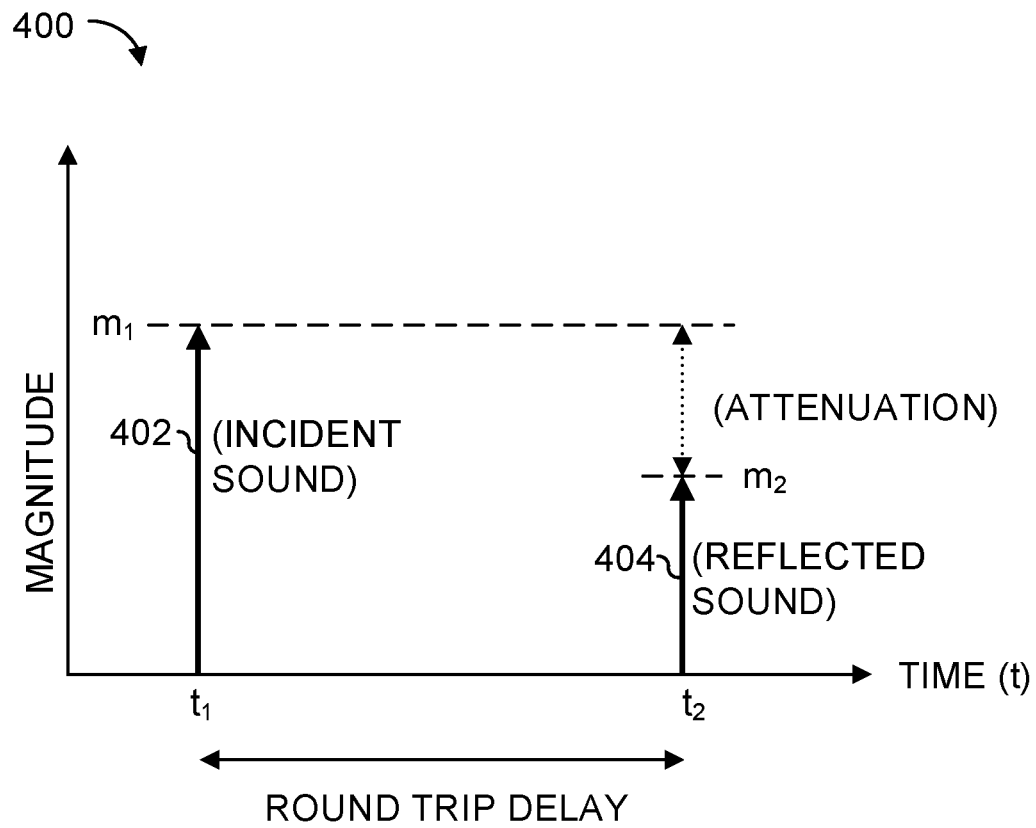
FIG. 4 is a plot illustrating a magnitude of an exemplary transmitted sound signal at a first time and a magnitude of an exemplary received signal at a second time in accordance with some embodiments.

FIG. 4 is a plot illustrating a magnitude of an exemplary transmitted sound signal at a first time and a magnitude of an exemplary received signal at a second time in accordance with some embodiments. As shown in the plot 400, the incident sound signal 402 has a magnitude $m_1$ at the first time $t_1$, and the received sound signal 404 has a magnitude $m_2$ at the second time $t_2$. The reflected sound 404 sensed in the microphone may be attenuated compared to the incident (excitation) sound source. The amount of attenuation may be inversely proportional to the reflection coefficient of the target material.

For simple explanation, the incident angle shown in FIG. 4 is normal, although in some embodiments the incident angle may not be normal. In some embodiments, object recognition may be employed in parallel with image processing techniques, and the system implemented on the HMD may guide the user to a proper angle/position for correctly sensing the material/texture for the target object.

A texture like fur or carpet may absorb a sound more than a rigid ceramic surface absorbs the sound since the texture like fur or carpet can diffuse the sound. Since these absorption ratios may be known/obtained and may be considered as a kind of reflection coefficients, the texture and material of the object may be identified as a joint form.

Though the exemplary scenario of FIG. 2 illustrates the cat doll made of ceramic (e.g., which may be considered a complex shaped object) as the target object, the disclosed systems and methods may consider the nature of the sound reflection from flatter surfaces (e.g., a wall, a floor, a table) for improved material and/or texture identification.

In some embodiments, the excitation signal is designed to increase the quality (e.g., accuracy) of the material and/or texture identification. Dedicated excitation signals can be generated to cause, for example, a pseudo noise sequence, harmonic tones, sweep signal, and/or ultrasounds to be emitted.

Without a matching cue, when there are multiple objects in front of the HMD (e.g., AR glasses worn by a user), there may be an ambiguity of which object's material/texture information is obtained from the reflected sound among the multiple objects. The object's distance value may be obtained from both the depth camera and the reflected sound signal so that the system can correctly augment the obtained texture information onto the matched object (e.g., presented via the HMD). Each individual depth (distance) value of multiple objects may be obtained from a depth camera installed in the HMD (or otherwise communicatively coupled to the HMD), and the depth value of the target object along with material/texture information can be measured using the sound signal too. By using the distance value as a matching cue, the system can identify the target object that has the matching material/texture information.

In some embodiments, multiple speakers (and/or ultrasonic actuators) and/or multiple microphones may be employed to generate and/or sense further directive sound dedicated to the target objects.

The disclosed systems and methods may employ peripherals (e.g., cameras, speakers, and/or microphones) in material and/or texture identification that are already included with HMDs (e.g., commercially available HMDs, such as Microsoft HoloLens®, Google Glass®, etc.). Discrimination of a fur (e.g., fur of a real cat) from a ceramic (e.g., a cat doll made of ceramic) may be performed using the sound cue. Compared to the conventional texture/material identification algorithms (solely using visual information), additional computational cost may be marginal, thus the disclosed systems and methods may be easily employed in a mobile environment.

Figure 5:
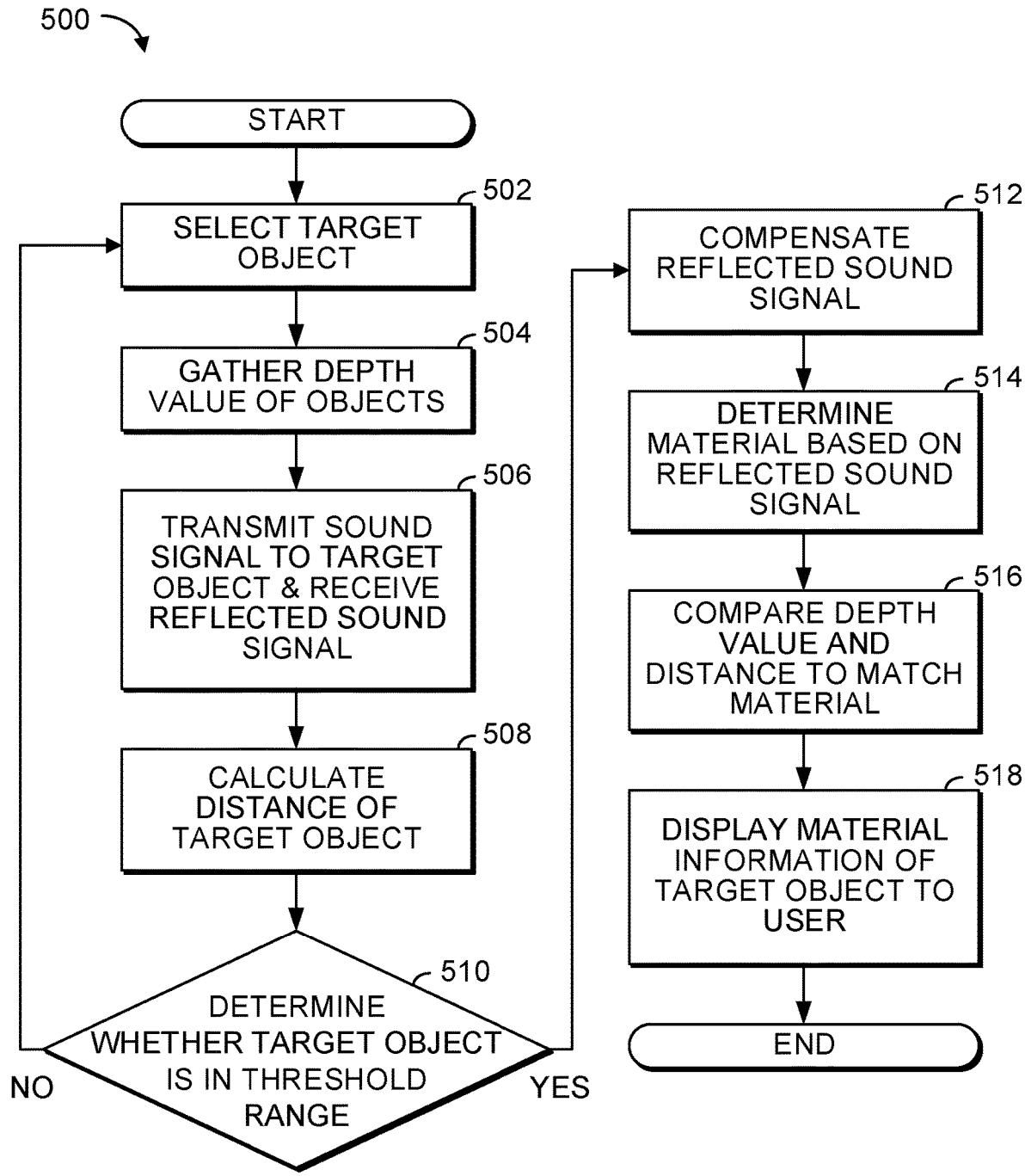
FIG. 5 is a flowchart of an exemplary method for identifying a material and/or texture of an object by employing sound in accordance with some embodiments.
Figure 6:
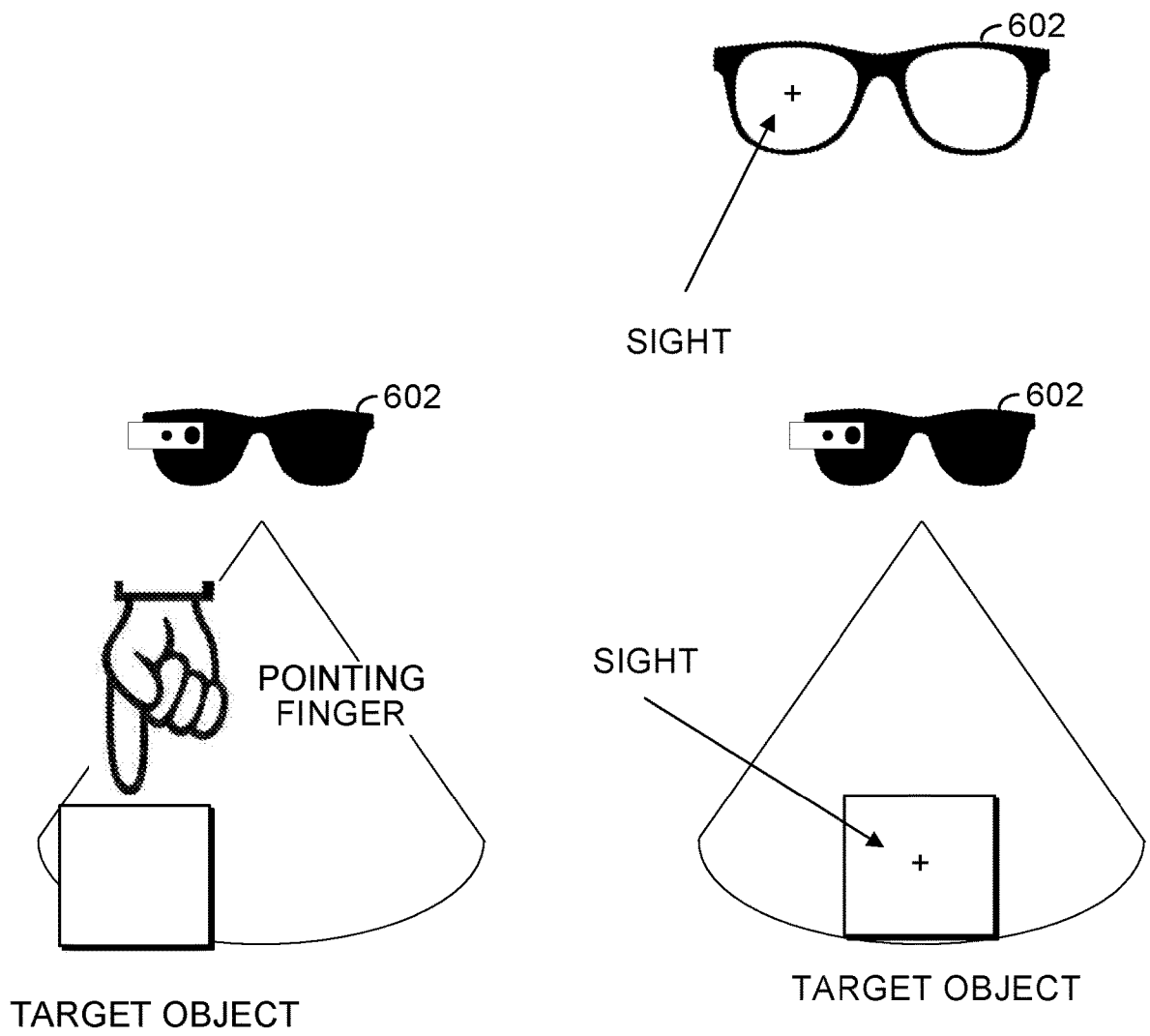
FIG. 6 illustrates an example overview of target object selection in accordance with some embodiments.

FIG. 5 is a flowchart of an exemplary method for identifying material and/or texture of an object by employing sound. In step 502 of the exemplary method 500, a target object is selected. Some HMDs (e.g., smart glasses for AR) are able to recognize a user's hand gesture and/or are able to track movement of a user's pointing finger and/or of a user's eyes. By using such technology, the target object for material/texture identification can be specified (e.g., selected by the user). In some embodiments, additionally, or alternatively, a focus mark is displayed on a glass display portion of the HMD and can be employed for object selection. FIG. 6 illustrates an example overview of target-object selection. The example pair of smart glasses 602 is configured to recognize/track a movement and/or a direction of a user's hand gesture, pointing finger, and/or eyes, and is configured to determine object-selection data based on the recognized/tracked user movement/direction. As illustrated in FIG. 6, the smart glasses 602 may determine target-object selection data that may be indicative of movement of a user's finger with respect to the target object. The smart glasses 602 may determine target-object selection data that may be indicative of movement of a user's eyes with respect to the target object. As further illustrated in FIG. 6, the smart glasses 602 may determine target-object selection data based on a position of a focus mark that is displayed to the user. In either scenario, the target-object selection data may be indicative of a direction to emit a sound signal so that the sound signal may reflect off the target object. The target object may be selected so that a directional sound signal can be emitted in a direction of the selected target object. In some embodiments, an adjacent object located near the selected target object can be a secondary target object.

Figure 7:
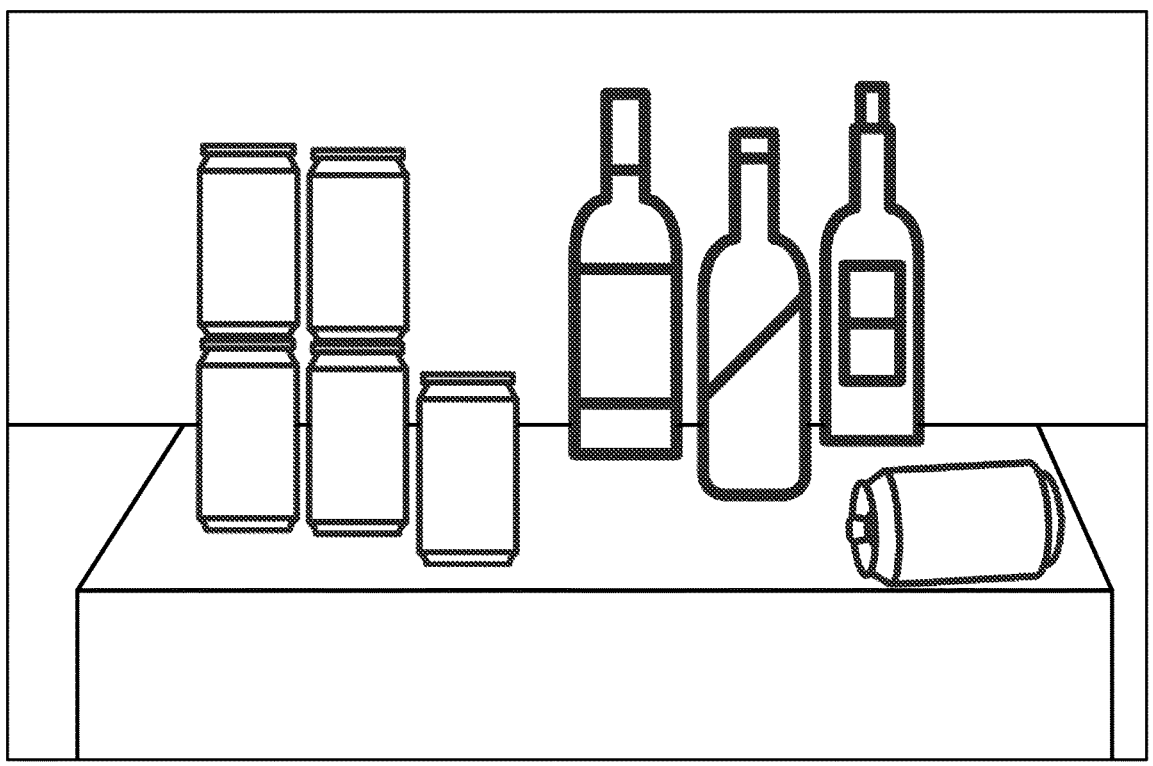
FIG. 7 is an illustration of an exemplary real-world image of a group of objects from which an exemplary target object may be selected in accordance with some embodiments.
Figure 8:
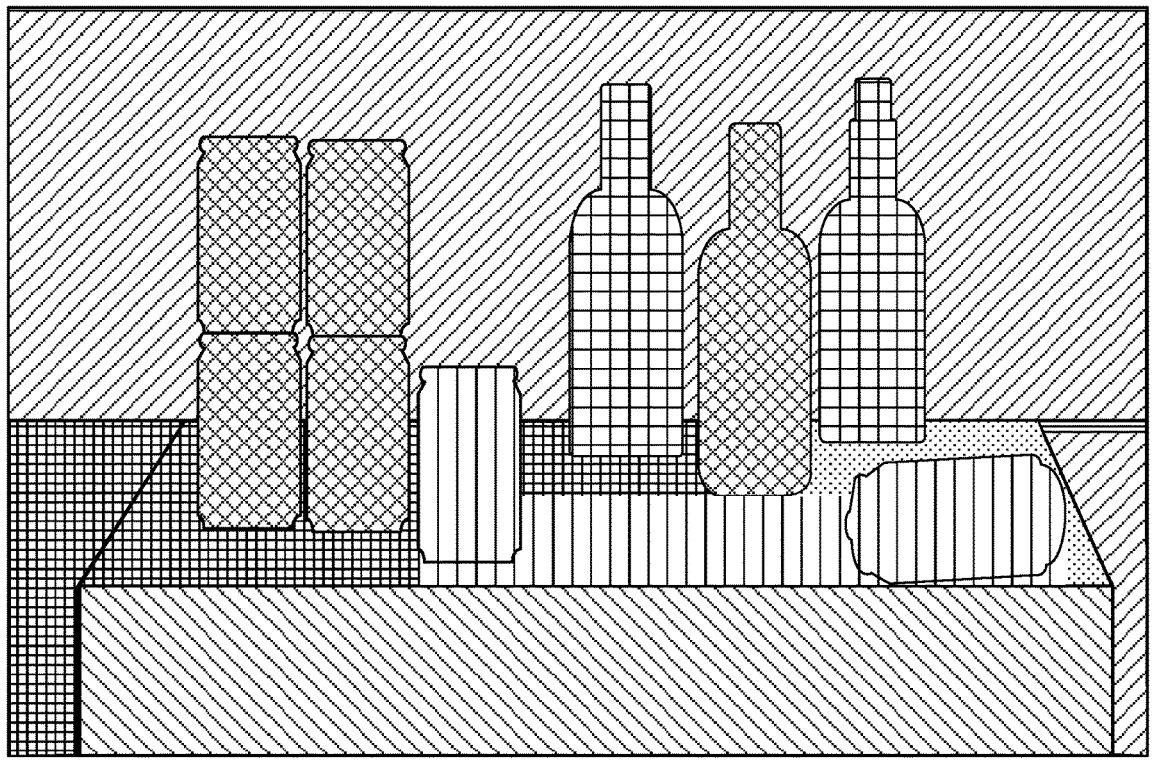
FIG. 8 is an illustration of an exemplary depth image with exemplary depth values of the real-world image of the group of objects from FIG. 7 in accordance with some embodiments.

In step 504 of the exemplary method 500, depth values for one or more objects (e.g., one or more objects on a nightstand, see FIG. 7) are gathered. The system may employ an HMD having a depth camera, for example, similar to or the same as the depth camera employed in Microsoft's HoloLens® or in Microsoft's Kinect®. In some embodiments, the gathered/acquired depth value is not displayed to the user (e.g., via the HMD), but the gathered/acquired depth value may be used for matching a target object and its material/texture.

As shown in Table 1 above, various frequencies of sound signals are used for material identification. Each material may have different absorption characteristics for various frequencies of an incident signal. In step 506 of the exemplary method 500, a sound signal having different frequencies can be transmitted (e.g., using beamforming) to the target object sequentially. After that, the system, at the HMD, receives the reflected sound signals of various frequencies having respective magnitude/amplitude values.

In step 508 of the exemplary method 500, a distance to the target object is calculated. A distance (D) between the HMD and the target object can be calculated from the time difference between the emitted sound signal and the received sound signal (See FIG. 4). For example, the distance (D) between the HMD and the target object may be calculated using equation (1). In equation (1), the variable $t_2$ may represent a time at which the reflected excitation signal is received, and the variable $t_1$ may represent a time at which the excitation signal sound is emitted. The difference in time between the time $t_2$ and the time $t_1$ may represent a round-trip travel time of the sound signal from the HMD to the target object and back to the HMD. The speed of a sound signal propagating through a medium may depend on one or more characteristics of the medium, such as, for example, a temperature of the medium, a humidity of the medium, and/or a type of the medium. In some embodiments, when calculating D (e.g., according to equation (1)), the speed of sound in the medium in which the target object is located may be used. In some other embodiments, when calculating D (e.g., according to equation (1)), the speed of sound in a medium having similar characteristics as the medium that the target object is located may be used.

$$D=((t2-t1)/2)*(\text{speed of sound}) \quad \text{Equation (1):}$$

In step 510 of the exemplary method 500, whether the target object is in a threshold range is determined. In some scenarios, sound attenuates over distance rapidly. Accordingly, a threshold distance for effective material identification may be established (e.g., 5 m) for stable performances. For example, if the distance between the target object and the HMD exceeds the threshold, the HMD may not perform material identification (e.g., for that object and/or for adjacent objects). The value of threshold range may be determined by several conditions, such as, for example, noise level, effective sensing range of the depth camera, a condition of a medium/atmosphere (e.g., temperature, humidity), and the like. The sound attenuation in the air may be affected by distance, temperature, and humidity, as well as other characteristics. Sound propagation is affected by spreading, absorption, ground configuration, terrain profile, obstacles, pressure, wind, turbulence, temperature, humidity, etc. In some embodiments, step 510 is omitted and the system attempts material and/or texture identification regardless of the distance between the HMD and the object.

Figure 9:
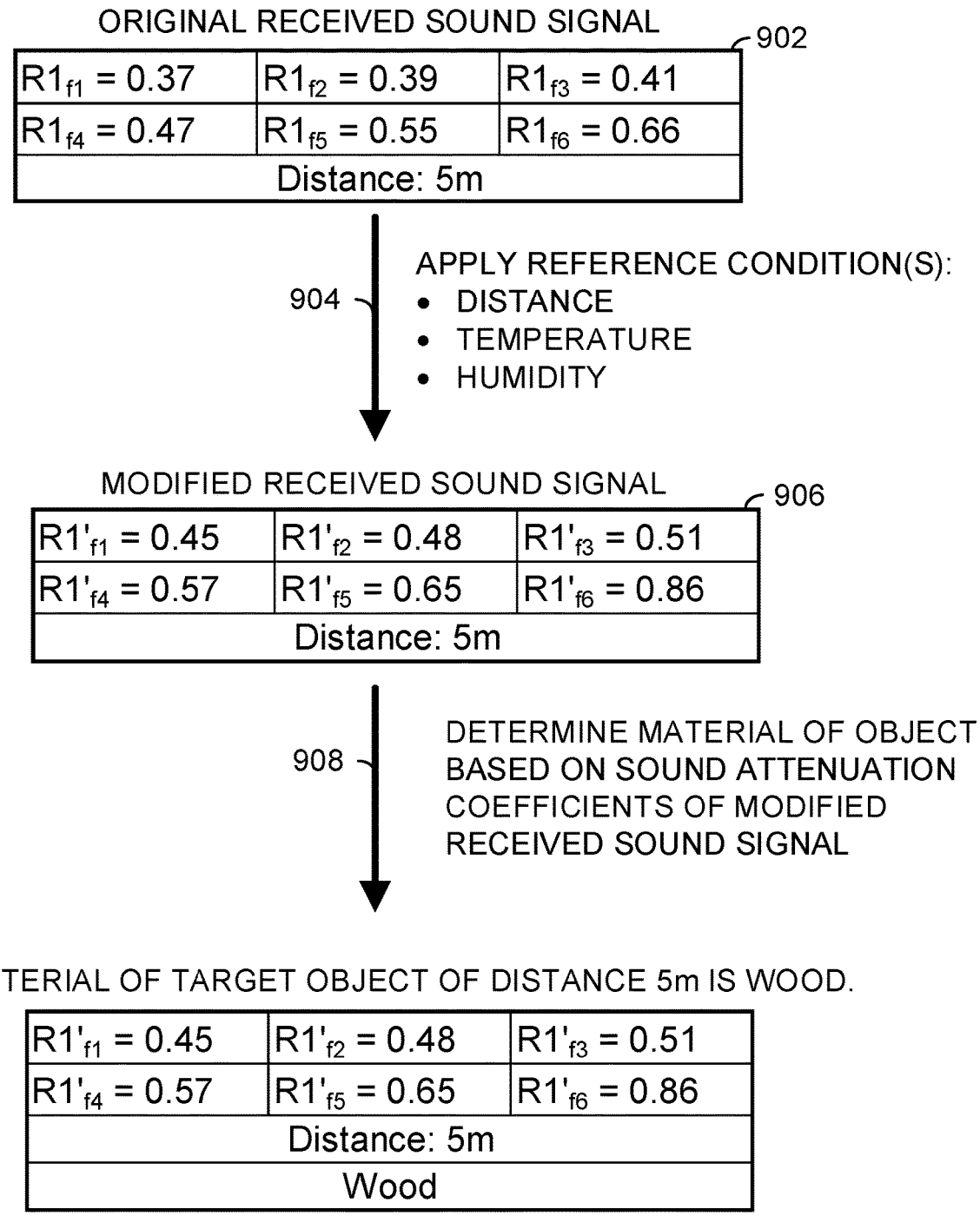
FIG. 9 is a flow chart illustrating an exemplary modification of sound signal data in accordance with some embodiments.

In step 512 of the exemplary method 500, the reflected sound signal is compensated. To improve the accuracy of material/texture identification, received sound signals may be compensated, for example, by applying a relationship between sound attenuation coefficients and the conditions of atmosphere to the received sound signals. FIG. 9 is a flow chart illustrating an exemplary modification of sound signal data in accordance with some embodiments. Exemplary sound attenuation coefficients for an original received sound signal at six respective frequencies (f1-f6) and a computed distance are shown at 902. At 904, data corresponding to one or more atmosphere reference conditions are applied to the exemplary sound attenuation coefficients for the original received sound signal, which results in the exemplary sound attenuation coefficients for a modified received sound signal shown at 906. Table 2 below is a table including exemplary atmospheric attenuation coefficients (in dB/km) at selected frequencies at 1 atm. For example, the received sound signals may be compensated by applying a corresponding atmospheric attenuation coefficient to a corresponding sound attenuation coefficient. Known atmospheric attenuation coefficients (e.g., from a dataset of the data of Table 2) may be stored in a storage, such as, for example, memory/storage 108. As a result of compensating the received sound signal, the effect of one or more conditions of the atmosphere may be neutralized/reduced. Moreover, based on the distance and the condition of atmosphere (e.g., temperature and/or humidity), the values of received/reflected sound signals can be modified, for example, assuming that the target object is in the reference condition, such as a reference distance (e.g., 1 m), and reference values of temperature/humidity.

($R1_{1kHz}=0.04$), and 4 kHz ($R1_{4kHz}=0.07$) with the sound absorption coefficients of the corresponding frequency in Table 1, the material of the target object may be determined to be "brick, unglazed." As shown in FIG. 9 at 908, the exemplary sound attenuation coefficients for a modified received sound signal shown at 906 of FIG. 9 may be used to determine that the material of the object is "wood."

The AR system may employ one or more image processing techniques to analyze one or more images captured by the depth camera, for example, to aid in determining the material/texture of the target object. The one or more images captured by the depth camera (and/or another camera) may be analyzed to determine visual context data, which may allow the AR system to compare the compensated received reflected sound signal to a subset of the characteristics stored in the database. For example, the one or more images captured by the depth camera may be analyzed to determine visual context data which indicates that the target object has a shape similar to a laptop. Further to this example, as a result of the visual context data indicating that the image includes an object having similar shape to a laptop, a subset of characteristics may be determined (e.g., compare the characteristics of the received sound signal to characteristics

TABLE 2

| TEMP. | RELATIVE HUMIDITY (%) | 62.5 Hz | 125 Hz | 250 Hz | 500 Hz | 1 kHz | 2 kHz | 4 kHz | 8 kHz |
|---|---|---|---|---|---|---|---|---|---|
| 30° C. | 10 | 0.362 | 0.958 | 1.82 | 3.40 | 8.67 | 28.5 | 96.0 | 260 |
|  | 20 | 0.212 | 0.725 | 1.87 | 3.41 | 6.00 | 14.5 | 47.1 | 165 |
|  | 30 | 0.147 | 0.543 | 1.68 | 3.67 | 6.15 | 11.8 | 32.7 | 113 |
|  | 50 | 0.091 | 0.351 | 1.25 | 3.57 | 7.03 | 11.7 | 24.5 | 73.1 |
|  | 70 | 0.065 | 0.256 | 0.963 | 3.14 | 7.41 | 12.7 | 21.1 | 59.3 |
|  | 90 | 0.051 | 0.202 | 0.775 | 2.71 | 7.32 | 13.8 | 23.5 | 53.5 |
| 20° C. | 10 | 0.370 | 0.775 | 1.58 | 4.25 | 14.1 | 45.3 | 109 | 175 |
|  | 20 | 0.260 | 0.712 | 1.39 | 2.60 | 6.53 | 21.5 | 74.1 | 215 |
|  | 30 | 0.192 | 0.615 | 1.42 | 2.52 | 5.01 | 14.1 | 48.5 | 166 |
|  | 50 | 0.123 | 0.445 | 1.32 | 2.73 | 4.66 | 9.86 | 29.4 | 104 |
|  | 70 | 0.090 | 0.339 | 1.13 | 2.80 | 4.98 | 9.02 | 22.9 | 76.6 |
|  | 90 | 0.071 | 0.272 | 0.966 | 2.71 | 5.30 | 9.06 | 20.2 | 62.6 |
| 10° C. | 10 | 0.342 | 0.788 | 2.29 | 7.52 | 21.6 | 42.3 | 57.3 | 69.4 |
|  | 20 | 0.271 | 0.579 | 1.20 | 3.27 | 11.0 | 36.2 | 91.5 | 154 |
|  | 30 | 0.225 | 0.551 | 1.05 | 2.28 | 6.77 | 23.5 | 76.6 | 187 |
|  | 50 | 0.160 | 0.486 | 1.05 | 1.90 | 4.26 | 13.2 | 46.7 | 155 |
|  | 70 | 0.122 | 0.411 | 1.04 | 1.93 | 3.66 | 9.66 | 32.8 | 117 |
|  | 90 | 0.097 | 0.348 | 0.996 | 2.00 | 3.54 | 8.14 | 25.7 | 92.4 |
| 0° C. | 10 | 0.424 | 1.300 | 4.00 | 9.25 | 14.0 | 16.6 | 19.0 | 26.4 |
|  | 20 | 0.256 | 0.614 | 1.85 | 6.16 | 17.7 | 34.6 | 47.0 | 58.1 |
|  | 30 | 0.219 | 0.469 | 1.17 | 3.73 | 12.7 | 36.0 | 69.0 | 95.2 |
|  | 50 | 0.181 | 0.411 | 0.821 | 2.08 | 6.83 | 23.8 | 71.0 | 147 |
|  | 70 | 0.151 | 0.390 | 0.763 | 1.61 | 4.64 | 16.1 | 55.5 | 153 |
|  | 90 | 0.127 | 0.367 | 0.760 | 1.45 | 3.66 | 12.1 | 43.2 | 138 |

In step 514 of the exemplary method 500, the material of the target object is determined based on the received reflected sound signal. For example, after compensating the received reflected sound signal, the material of the target object may be estimated by comparing characteristics of the received sound with characteristics stored in a database (e.g., the data set of Table 1, which may be stored in the memory/storage 108). In some embodiments, in step 514, the material/texture of the target object is determined by comparing characteristics (e.g., reflection and/or absorption coefficients) of multiple frequencies of the compensated received reflected sound signal with characteristics stored in a database. An appropriate material may be determined when the corresponding compared values are matched within a predetermined threshold of accuracy. For example, referring to Table 1, by comparing the compensated received reflected sound signal for 125 Hz ($R1_{125Hz}=0.03$), 1 kHz of aluminum and plastic included in the database) for which the material of the target object may be determined. In this example, as a result of the visual context data determined from the analyzation of the one or more images, characteristics in the database for materials such as "wood" and "marble or glazed tile" are not used in the comparison. Employing the one or more image processing techniques in the manner described above may improve an accuracy of material/texture determinations of the target object and/or may reduce a number of processor cycles for which the material/texture of the target object may be determined.

In some embodiments, the AR system may account for different attenuation that is due to the shape, size, and/or orientation of an object (e.g., reflection of the sound signal by an oblique surface) in determining the material/texture of the target object. For example, the AR system may determine the material/texture of an object based on a plurality of material/texture estimations of the same object. For example, prior to displaying the material information of the target object, an estimation of a material/texture of an object may be carried out for a plurality of different spots of the object. This may reduce reports of false material/texture information that may result from material/texture determinations based on sound signals reflected from a boundary and/or edge of an object.

Figure 10:
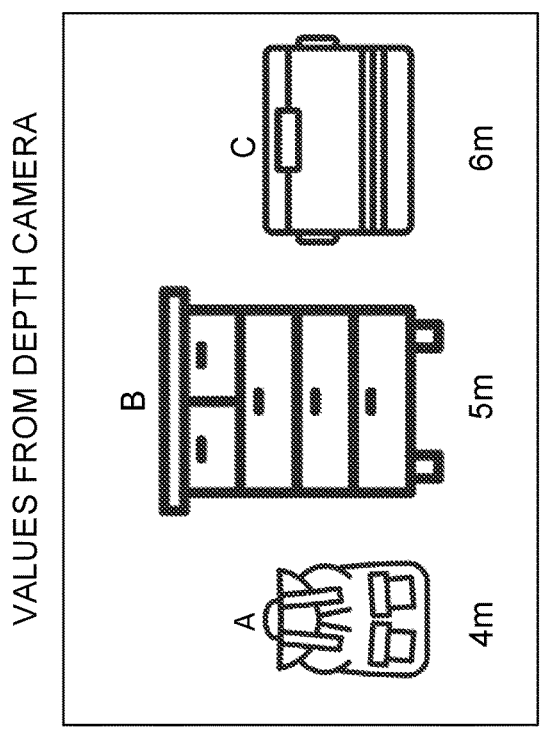
FIG. 10 illustrates an exemplary comparison of (a) a distance obtained from a time difference between a transmitted and a received sound signal and (b) a distance obtained from a depth camera, in accordance with some embodiments.

In step 516 of the exemplary method 500, one or more depth/distance values may be compared to the distance between the target object and the HMD. In some scenarios, the depth (distance) of multiple objects can be calculated by employing a depth camera, and each of the objects at the front of the HMD may have a respective depth (distance) value. In this step, the depth value of each object and the distance value calculated from the received sound signal may compared. In some embodiments. if the depth/distance value of obtained from the depth camera matches the distance value calculated from the received sound signal of the target object, the object is set to the material determined from the received sound signal (e.g., in step 514). For example, as illustrated in FIG. 10, if the depth value of a specific object (e.g., object B, which is a dresser drawer) is the same as the distance value determined from the received sound signal (e.g., 5 m), the material of that object may be set as the material determined from the received sound signal (e.g., "wood").

Figure 11:
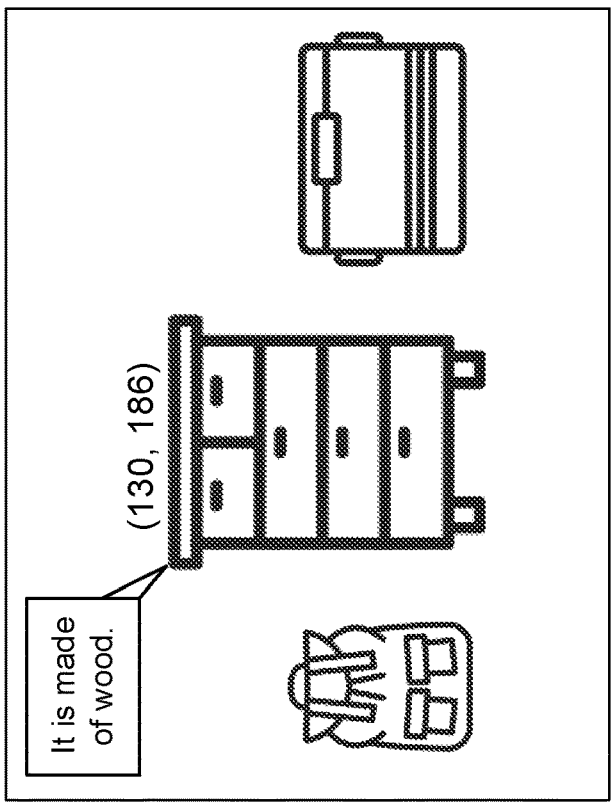
FIG. 11 illustrates an exemplary display of material-related information to an exemplary user and of exemplary sensing results from an example depth camera in accordance with some embodiments.
Figure 11:
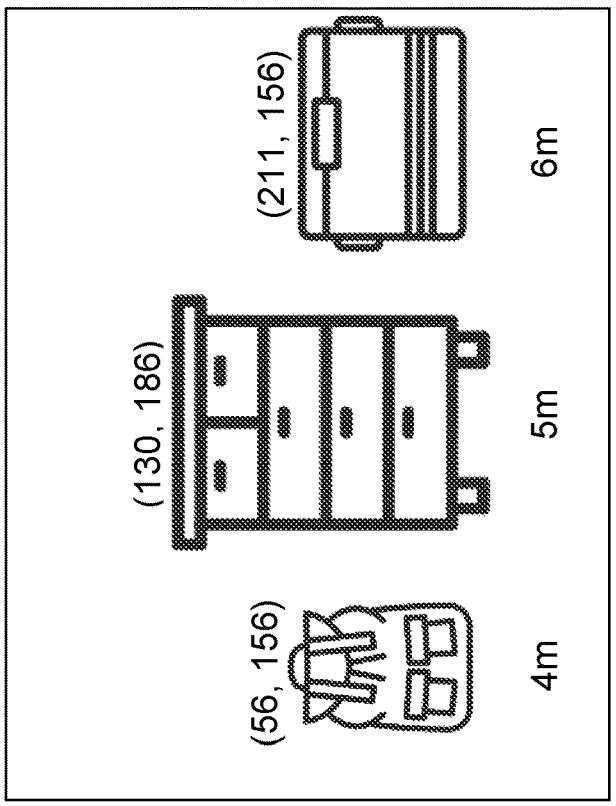

In step 518 of the exemplary method 500, the material information of the target object is displayed, for example, to the user. For example, the identified material/texture information may be augmented via the HMD, and the resulting augmented image may be presented to the user. Material-related information may be displayed, to the user, in the augmented image on the position of the target object. The location of information can be retrieved from sensing result of the depth camera. FIG. 11 illustrates an example display of material-related information to an example user and example sensing results from an example depth camera in accordance with some embodiments.

Figure 12:
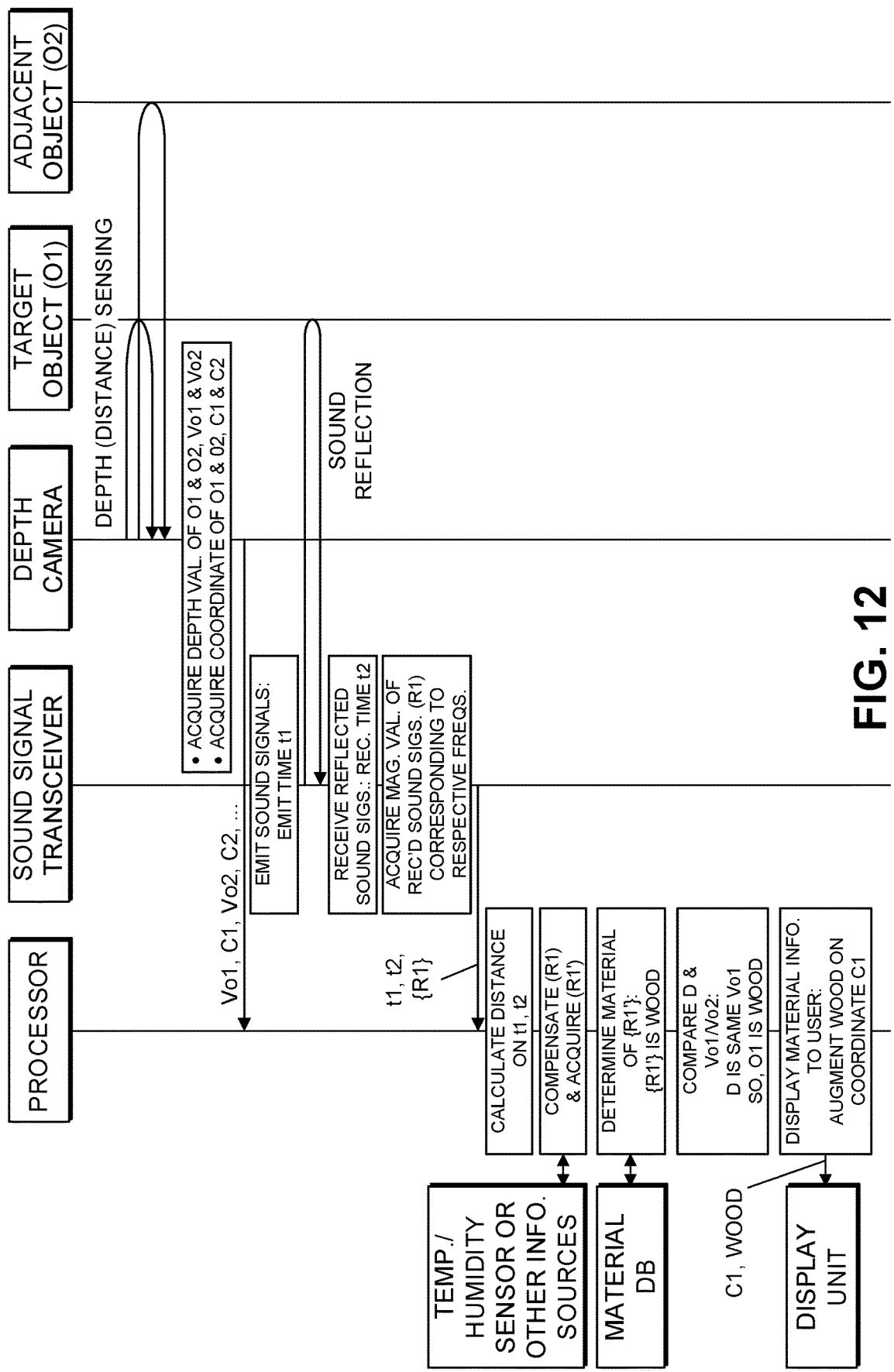
FIG. 12 is a flow diagram of an example data flow and/or data processing for material and/or texture identification of a target object in accordance with some embodiments.

FIG. 12 is a flow diagram of an example data flow and/or data processing for material and/or texture identification of a target object.

Techniques for rendering virtual objects over real images may be improved by accurately identifying subtle features of objects, such as textural differences between cloth and other materials (e.g., fur, skin, or glass). As a result of identifying the material and/or texture of the target object, the user may correctly receive (e.g., view) augmented information based on the identified texture information.

As a result of employing sound signals for identification of material and/or texture, an unintended sound, such as background noise, may degrade the performance of the material and/or texture identification. In some embodiments, to reduce the possibility of this occurring, the sound signal transceiver may have an adaptive noise filter that may remove/reduce background noise. In some embodiments, if the level of background noise is higher than a threshold value, the system can analyze the noise, and the system can determine the frequency band having the lowest noise level. Then, the sound signal corresponding to the chosen frequency band can be used to recognize the material and/or texture of the target object.

Figure 13A:
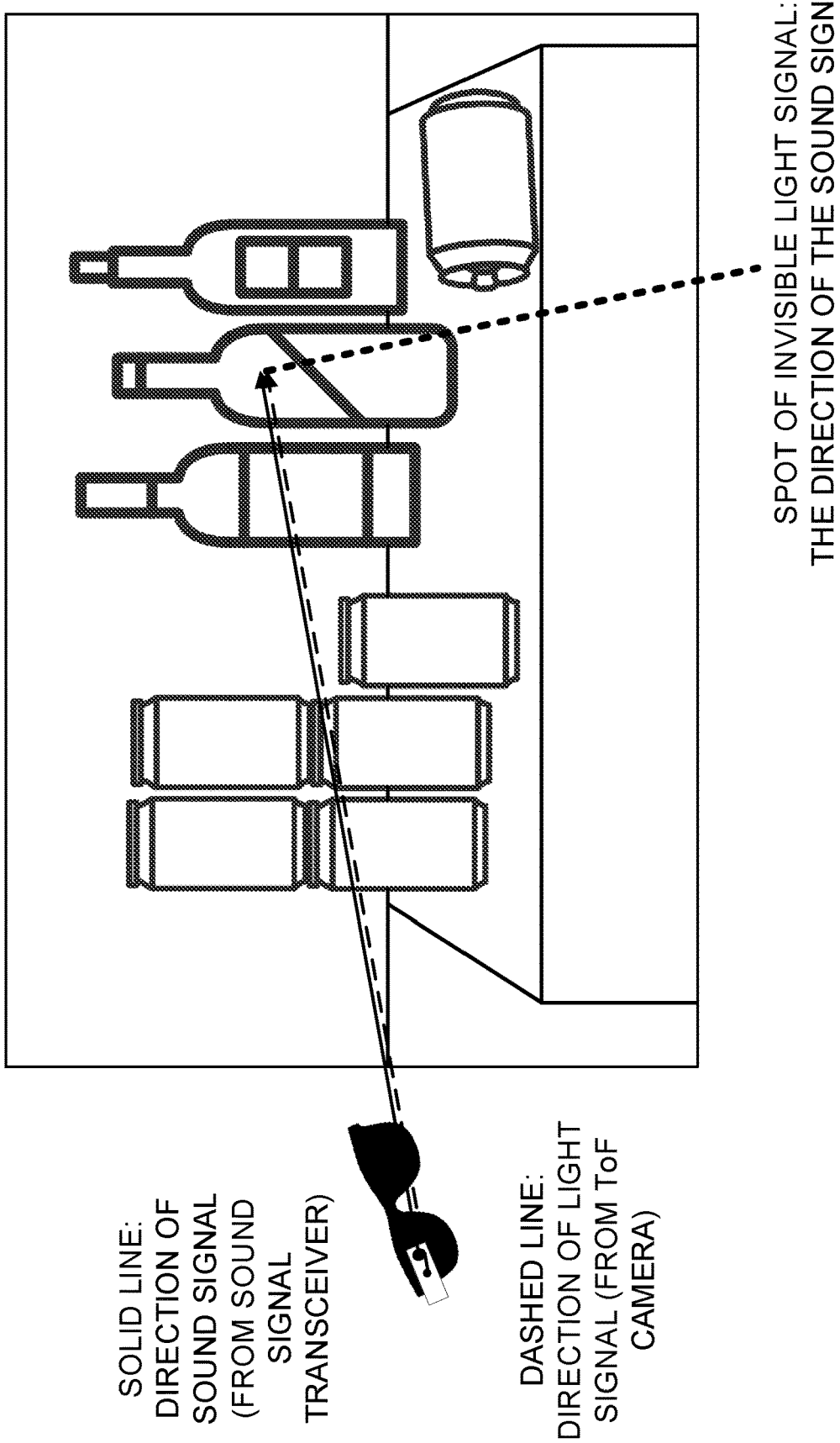
FIGS. 13A-13C is an illustration of an example overview identifying a target object from a group of objects in accordance with some embodiments.
Figure 13B:
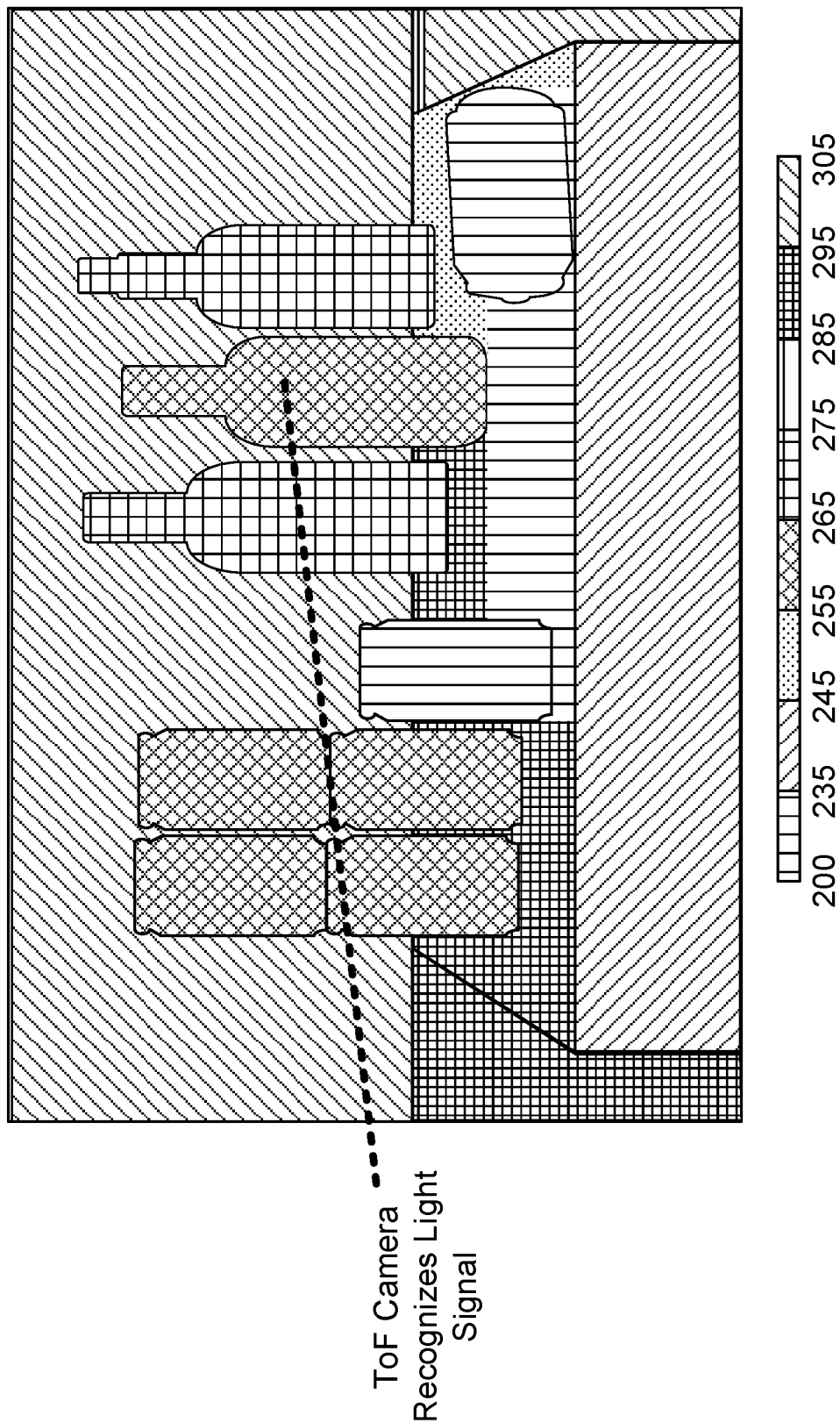
Figure 13C:
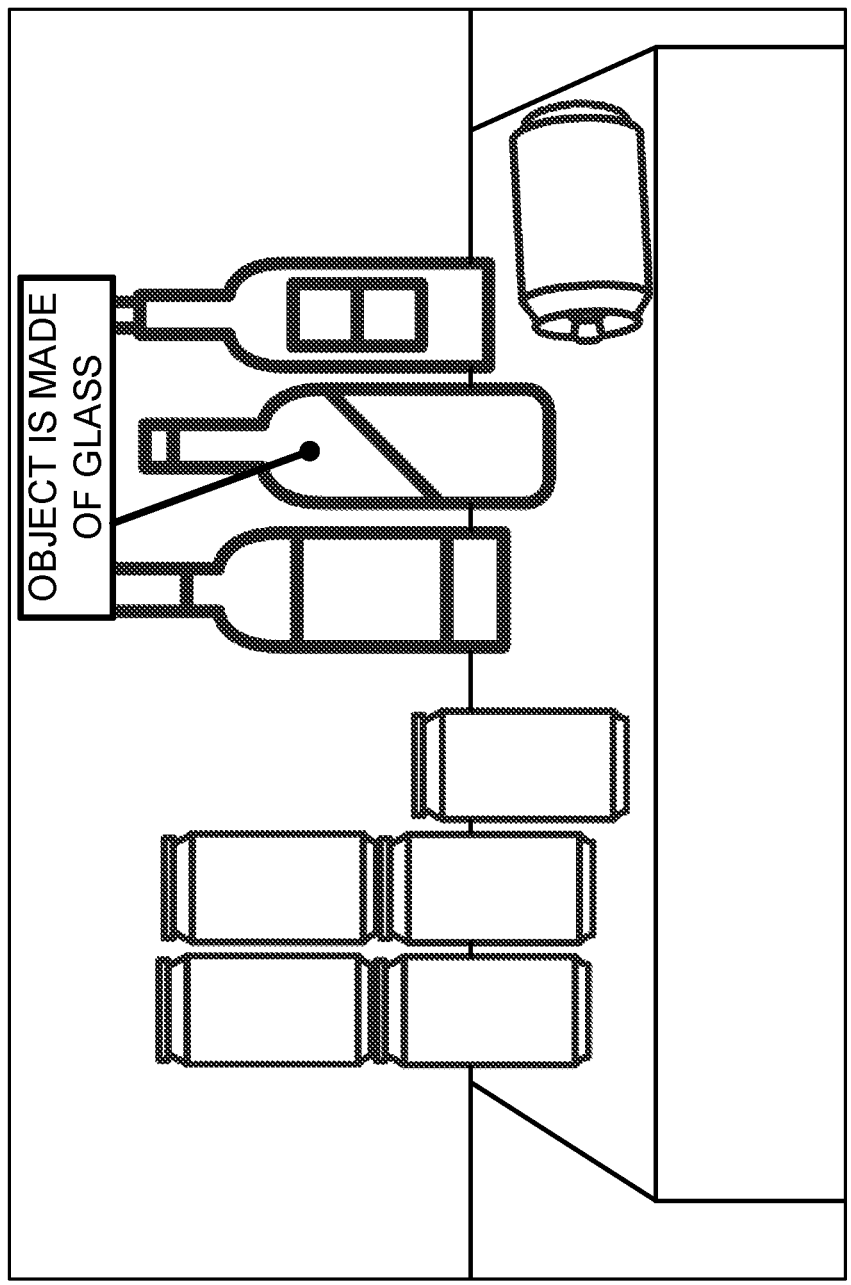

FIGS. 13A-13C is an illustration of an example overview identifying a target object from a group of objects in accordance with some embodiments. In some embodiments, an active type depth camera, such as a ToF (time-of-flight) camera can be employed in the system. In some embodiments, the ToF camera is employed when multiple objects have the same depth value. In some embodiments, the sound signal for material and/or texture estimation is a directional signal (e.g., has strong directivity). By using various technologies (e.g., the Long-Range Acoustic Device (LRAD) of LRAD Corp.; and the Audio Spot Light of Holosonics Research Labs, Inc.), the light signal may have a similar property as the directional sound signal. At this moment, if a light signal is emitted in the direction of the sound signal, the ToF camera could recognize which object is the target. A coordinate for information augmentation may also be acquired. As a result of employing the ToF camera, the target object selection (step 502) may be simplified.

If an already known target—a reference material sample—is prepared, an influence of the atmosphere can be estimated. This reference material sample may play a similar role in material/texture identification as a "grey card" in photography. In some embodiments, estimating the influence of the atmosphere includes the following steps: (1) position the reference material sample at a point having certain (reference) distance (e.g. 1 m) from the HMD; (2) emit sound signals to the reference material sample and receive a reflected sound signal; (3) compare a sound absorption coefficient of the reference material sample "Ref. value" and the decreased magnitude from the received sound signal "Dec. value"; (4) set an "influence factor of atmosphere" based on a relationship between the Ref. value and the Dec. value; and/or (5) apply the influence factor of the atmosphere during another material identification.

Figure 14:
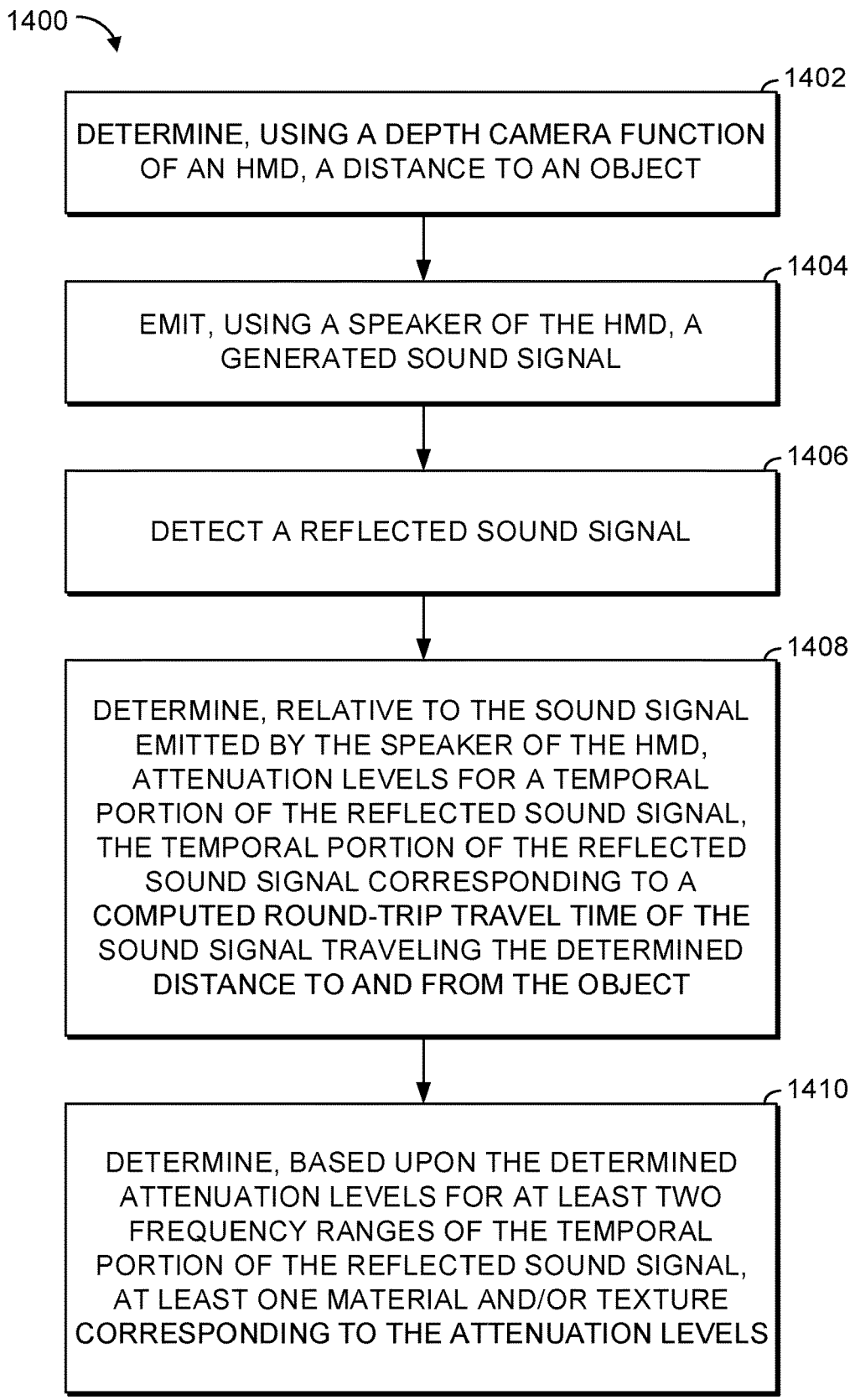
FIG. 14 is a flow chart of an exemplary method for identifying a material and/or texture of an object by employing sound in accordance with some embodiments.

FIG. 14 is a flowchart of an exemplary method for determining, using an AR HMD, a material and/or texture of an object. In step 1402 of the exemplary method 1400, a distance to an object (e.g., a distance between the AR HMD and the object) is determined using a depth camera function of the AR HMD (e.g., the depth camera of the HMD of FIG. 1). In the exemplary method, the depth camera function of the AR HMD employed to determine the distance to the object may be any conventional range imaging technique suitable for use by an HMD in determining a distance to an object from the HMD.

In step 1404 of the exemplary method 1400, a generated sound signal is emitted using a speaker of the HMD. In some embodiments, the generated sound signal that is emitted using the speaker of the HMD is an ultrasonic sound signal. For example, the emitted sound signal that is generated using the speaker of the HMD (e.g., a part of the sound signal transceiver of the HMD of FIG. 1 and/or the speaker of the smartphone of FIG. 2) may have a frequency higher than the audible hearing limit of humans having average hearing capabilities.

In step 1406 of the exemplary method 1400, a reflected sound signal is received. For example, the reflected sound signal may be received by a microphone of the HMD (e.g., a part of the sound signal transceiver of the HMD of FIG. 1 and/or the microphone of the smartphone of FIG. 2). After being received, the reflected sound signal may be sent to a processor (e.g., the processor of the HMD of FIG. 1 and/or the material and/or the texture identification module of FIG. 3) for processing.

In step 1408 of the exemplary method 1400, attenuation levels for at least two frequency ranges of the reflected sound signal relative to the sound signal emitted by the speaker of the HMD are determined. In this step, the attenuation levels are determined for a temporal portion of the reflected sound signal corresponding to a computed round-trip travel time for the sound signal traveling the determined distance to and from the object. The attention levels of the reflected sound signal received relative to the sound signal emitted may be determined by comparing a signal strength of the emitted signal to a signal strength of the received signal, the difference between the two signal strengths being the attenuation level. The attenuation levels may be determined for at least two frequencies of the reflected signal. These attenuation levels may be determined for the reflected sound signal by using the distance determined between the object and the HMD and conditions of the atmosphere in which the reflected signal traveled (e.g., the atmosphere in which the object is located).

In step 1410 of the exemplary method 1400, at least one material and/or texture corresponding to the attenuation levels is determined. In this step of the exemplary method, the at least one material and/or texture is determined based on the determined attenuation levels for at least two frequency ranges of the temporal portion of the reflected sound signal, at least one material and/or texture corresponding to the attenuation levels. The determined attenuation levels may be used to retrieve material and/or texture data corresponding to the attenuation levels. For example, the material "wood" and a corresponding attenuation level data (e.g., in a determined temperature and/or humidity of the atmosphere and a determined distance away from an object) for a corresponding frequency level of an incident sound signal may be stored in a database. This data may be retrieved once the attenuation level is known and may be used to augment information on a display of the HMD.

Figure 15:
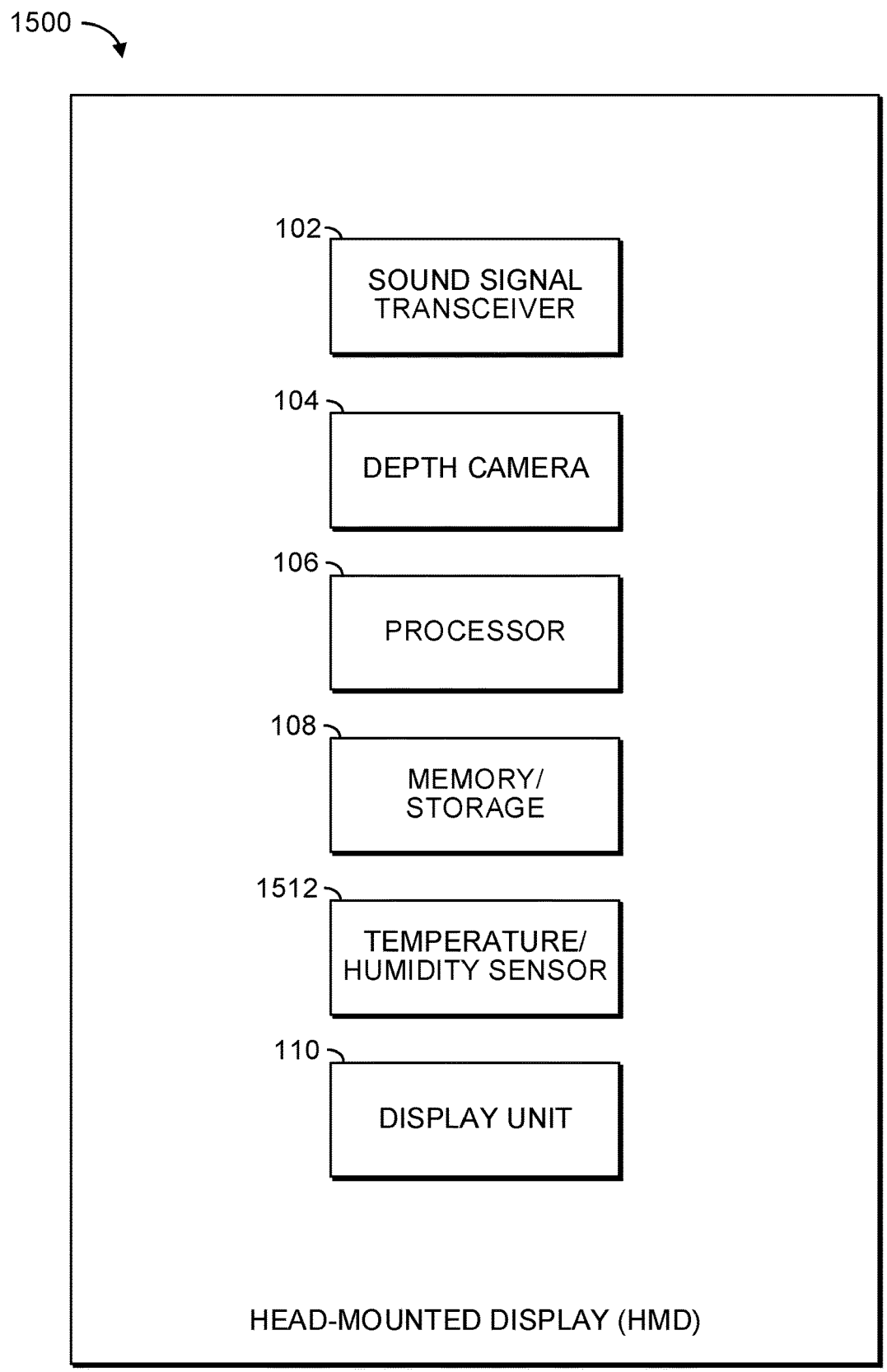
FIG. 15 is a block diagram illustrating an exemplary architecture of an exemplary augmented-reality system implemented on a head-mounted display (HMD) in accordance with some embodiments.

FIG. 15 is a block diagram of an exemplary architecture of an augmented-reality (AR) system, implemented in an HMD, for identifying a material and/or texture of an object in accordance with some embodiments. The exemplary architecture of FIG. 15 is the same as the exemplary architecture of FIG. 1, except that the exemplary architecture of FIG. 15 additionally includes a temperature/humidity sensor 1512. The temperature/humidity sensor 1512 may be a thermometer that detects a temperature and/or humidity of the atmosphere in which the object is located. The temperature/humidity sensor may send atmosphere condition data to the memory/storage which may be retrieved for processing by the processor.

Exemplary embodiments disclosed herein are implemented using one or more wired and/or wireless network nodes, such as a wireless transmit/receive unit (WTRU) or other network entity.

Figure 16:
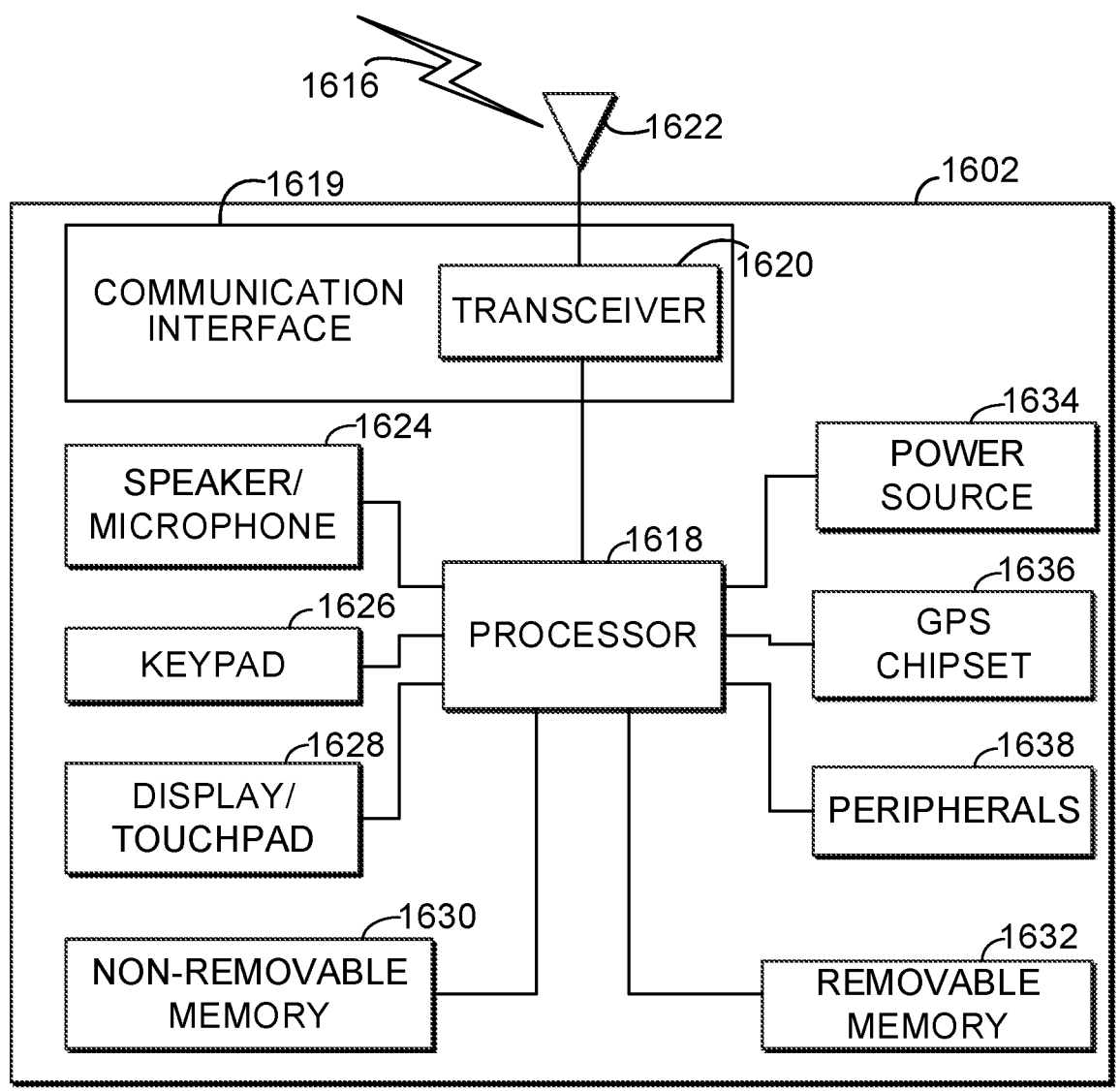
FIG. 16 is a system diagram of an exemplary wireless transmit receive unit (WTRU) which may be employed as an exemplary system implemented in an exemplary HMD in accordance with some embodiments.

FIG. 16 is a system diagram of an exemplary WTRU 1602, which may be employed as a system, implemented on an HMD, in embodiments described herein. As shown in FIG. 18, the WTRU 1602 may include a processor 1618, a communication interface 1619 including a transceiver 1720, a transmit/receive element 1622, a speaker/microphone 1624, a keypad 1626, a display/touchpad 1628, a non-removable memory 1630, a removable memory 1632, a power source 1634, a global positioning system (GPS) chipset 1636, and sensors 1638. It will be appreciated that the WTRU 1602 may include any sub-combination of the foregoing elements while remaining consistent with an embodiment.

The processor 1618 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1618 may perform signal coding, data processing, power control, input/output processing, and/or any other functionality that enables the WTRU 1602 to operate in a wireless environment. The processor 1618 may be coupled to the transceiver 1620, which may be coupled to the transmit/receive element 1622. While FIG. 16 depicts the processor 1618 and the transceiver 1620 as separate components, it will be appreciated that the processor 1618 and the transceiver 1620 may be integrated together in an electronic package or chip.

The transmit/receive element 1622 may be configured to transmit signals to, or receive signals from, a base station over the air interface 1616. For example, in one embodiment, the transmit/receive element 1622 may be an antenna configured to transmit and/or receive RF signals. In another embodiment, the transmit/receive element 1622 may be an emitter/detector configured to transmit and/or receive IR, UV, or visible light signals, as examples. In yet another embodiment, the transmit/receive element 1622 may be configured to transmit and receive both RF and light signals. It will be appreciated that the transmit/receive element 1622 may be configured to transmit and/or receive any combination of wireless signals.

In addition, although the transmit/receive element 1622 is depicted in FIG. 16 as a single element, the WTRU 1602 may include any number of transmit/receive elements 1622. More specifically, the WTRU 1602 may employ MIMO technology. Thus, in one embodiment, the WTRU 1602 may include two or more transmit/receive elements 1722 (e.g., multiple antennas) for transmitting and receiving wireless signals over the air interface 1616.

The transceiver 1620 may be configured to modulate the signals that are to be transmitted by the transmit/receive element 1622 and to demodulate the signals that are received by the transmit/receive element 1722. As noted above, the WTRU 1602 may have multi-mode capabilities. Thus, the transceiver 1720 may include multiple transceivers for enabling the WTRU 102 to communicate via multiple RATs, such as UTRA and IEEE 802.11, as examples.

The processor 1618 of the WTRU 1602 may be coupled to, and may receive user input data from, the speaker/microphone 1624, the keypad 1626, and/or the display/touchpad 1628 (e.g., a liquid crystal display (LCD) display unit or organic light-emitting diode (OLED) display unit). The processor 1618 may also output user data to the speaker/microphone 1624, the keypad 1626, and/or the display/touchpad 1628. In addition, the processor 1618 may access information from, and store data in, any type of suitable memory, such as the non-removable memory 1630 and/or the removable memory 1632. The non-removable memory 1630 may include random-access memory (RAM), read-only memory (ROM), a hard disk, or any other type of memory storage device. The removable memory 1632 may include a subscriber identity module (SIM) card, a memory stick, a secure digital (SD) memory card, and the like. In other embodiments, the processor 1618 may access information from, and store data in, memory that is not physically located on the WTRU 1602, such as on a server or a home computer (not shown).

The processor 1618 may receive power from the power source 1634 and may be configured to distribute and/or control the power to the other components in the WTRU 102. The power source 1634 may be any suitable device for powering the WTRU 1602. As examples, the power source 1634 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1618 may also be coupled to the GPS chipset 1636, which may be configured to provide location information (e.g., longitude and latitude) regarding the current location of the WTRU 1602. In addition to, or in lieu of, the information from the GPS chipset 1636, the WTRU 1602 may receive location information over the air interface 1616 from a base station and/or determine its location based on the timing of the signals being received from two or more nearby base stations. It will be appreciated that the WTRU 1602 may acquire location information by way of any suitable location-determination method while remaining consistent with an embodiment.

The processor 1618 may further be coupled to other peripherals 1638, which may include one or more software and/or hardware modules that provide additional features, functionality and/or wired or wireless connectivity. For example, the peripherals 1638 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Another embodiment takes the form of a method that includes emitting a sound signal from a wearable display device to an object. The method also includes receiving a reflected sound signal. The method also includes calculating a distance of the object to the wearable display device based on a time difference between emitting the sound signal and receiving the reflected sound signal. The method also includes determining a material and/or texture of the object based on the calculated distance.

Another embodiment takes the form of a method that includes emitting a sound signal from a wearable display device to an object. The method also includes receiving a reflected sound signal having a received signal strength. The method also includes compensating the received signal strength of the reflected sound signal. The method also includes determining a material and/or texture of the object based on the compensated received signal strength of the reflected sound signal.

Another embodiment takes the form of a method that includes emitting a sound signal. The method also includes receiving a reflected sound signal. The method also includes calculating a distance to a target object based on sound signals. The method also includes determining a distance to each object of a plurality of objects, the plurality of objects including the target object. The method also includes matching the calculated distance with one or more of the determined distances substantially similar to the calculated distance. The method also includes determining a material and/or texture of the target object based on a received signal strength of the received reflected sound signal. The method also includes presenting material and/or texture identification data.

In at least one embodiment, determining a material and/or texture of the object based on a received signal strength of the received reflected sound signal comprises adjusting a received signal strength of the received reflected sound signal. Such an embodiment may be called an RSSI adjustment embodiment. In at least one RSSI adjustment embodiment, adjusting a received signal strength of the received reflected sound signal comprises determining atmospheric condition data. In at least one RSSI adjustment embodiment, adjusting a received signal strength of the received reflected sound signal is based on the calculated distance, temperature data, and/or humidity data.

In at least one embodiment, the emitted sound signal comprises two or more distinct frequencies. In at least one such embodiment, the two or more distinct frequencies are within the ultrasound frequency band.

In at least one embodiment, determining a material and/or texture of the target object based on a received signal strength of the received reflected sound signal comprises retrieving reflection and/or absorption coefficients.

Another embodiment takes the form of a method that includes emitting a sound signal. The method also includes receiving a reflected sound signal. The method also includes estimating a material and/or texture of an object based on the emitted sound signal and the received reflected sound signal. The method also includes comparing a first distance to the object to a second distance to the object. The method also includes presenting, based on the comparison and on the estimating, material and/or texture information.

Another embodiment takes the form of a method of identifying a material of a target object at an AR HMD (e.g., smart glasses). One such method includes a depth camera capturing an image of one or more objects; a depth camera acquiring a plurality of distances and/or coordinates of each object of the one or more objects; a sound signal transceiver transmitting a sound signal in substantially the same direction as the depth camera; a sound signal transceiver receiving a reflected sound signal; calculating a distance between one of the one or more objects and the AR HMD based on a time difference of the transmitted sound signal and the received reflected sound signal; modifying/calibrating the signal strength of the received reflected sound signal in consideration of atmospheric attenuation coefficients at a calculated distance under a given humidity and/or temperature; determining the material of the one of the one or more objects by the received sound signal strength in consideration of sound absorption coefficients at the calculated distance; comparing one or more distances of the plurality of distances acquired by the depth camera and the distance calculated based on the sound signals; selecting the identical and/or substantially similar distance and the corresponding object; displaying AR overlay on the selected object with identified material information. In some embodiments, the AR overlay includes coordinate(s) of the object captured by the depth camera.

What is claimed is:

1. A method of determining, using an augmented-reality (AR) display device, a material of an object, comprising:
   determining, using a depth camera function of the AR display device, a distance to an object;

emitting, using a speaker of the AR display device, a generated sound signal;

responsive to emitting the sound signal, detecting a reflected sound signal;

determining, relative to the sound signal emitted by the speaker of the AR display device, attenuation levels for a temporal portion of the reflected sound signal for at least two frequencies of the reflected sound signal, the temporal portion of the reflected sound signal corresponding to a computed round-trip travel time of the sound signal traveling the determined distance to and from the object; and determining a material of the object based upon the determined attenuation levels for the at least two frequencies.

2. The method of claim 1, further comprising obtaining, at the AR display device, object-selection data that is indicative of movement of a user of the AR display device with respect to the object, wherein a direction with respect to the object in which the generated sound signal is emitted is based on the object-selection data.

3. The method of claim 1, further comprising determining received signal strength data for the detected reflected sound signal, wherein determining the attenuation levels comprises adjusting the received signal strength data based on atmosphere-condition data associated with an atmosphere in which the object is located.

4. The method of claim 3, wherein the atmosphere-condition data comprises data selected from the group consisting of humidity data and temperature data.

5. The method of claim 3, wherein the atmosphere-condition data comprises respective atmospheric attenuation coefficients corresponding to the at least two frequency levels.

6. The method of claim 1, wherein determining a material of the object comprises comparing the determined attenuation levels for the respective frequencies with respective sound absorption coefficients associated with the material.

7. The method of claim 1, further comprising calibrating the attenuation levels based on atmosphere-condition data associated with an atmosphere in which the object is located.

8. The method of claim 1, further comprising presenting, via a display of the AR display device, material information based on the determined material.

9. The method of claim 8, wherein presenting, via a display of the AR display device, material information based on the determined material comprises augmenting the material information over an image including the object.

10. The method of claim 1, wherein the AR display device includes a sound signal transceiver that performs the detecting of the reflected sound signal.

11. The method of claim 1, wherein the emitted sound signal is an ultrasound signal.

12. The method of claim 1, wherein the emitted sound signal comprises at least two distinct frequencies.

13. The method of claim 1, further comprising presenting an AR character via a display of the AR display device, the AR character interacting with the object based on the determined material of the object.

14. The method of claim 1, further comprising detecting the object from a plurality of objects at least by emitting a light signal from a time-of-flight camera in a direction of the sound signal.

15. The method of claim 1, wherein the AR display device is a head-mounted display (HMD).

16. The method of claim 1, wherein determining the material of the object comprises determining a material of an exterior surface of the object.

17. The method of claim 1, wherein determining the material of the object comprises determining a material of an exterior surface of the object.

18. A system comprising a processor and a non-transitory storage medium storing instructions operative, when executed by the processor, to perform the functions of:

determining, using a depth camera function of an augmented-reality (AR) display device, a distance to an object;

emitting, using a speaker of the AR display device, a generated sound signal;

responsive to emitting the sound signal, detecting a reflected sound signal;

determining, relative to the sound signal emitted by the speaker of the AR display device, attenuation levels for a temporal portion of the reflected sound signal for at least two frequencies of the reflected sound signal, the temporal portion of the reflected sound signal corresponding to a computed round-trip travel time of the sound signal traveling the determined distance to and from the object; and determining a material of the object based upon the determined attenuation levels for the at least two frequencies.

19. The system of claim 18, wherein determining the material of the object comprises determining a material of an exterior surface of the object.

20. A method comprising:

determining, using a depth camera, a distance to an object;

emitting a generated sound signal;

responsive to emitting the sound signal, detecting a reflected sound signal;

determining, relative to the emitted sound signal, attenuation levels for a temporal portion of the reflected sound signal for at least two frequencies of the reflected sound signal, the temporal portion of the reflected sound signal corresponding to a computed round-trip travel time of the sound signal traveling the determined distance to and from the object; and determining a material of the object based upon the determined attenuation levels for the at least two frequencies.

* * * * *